US010845820B2

(12) United States Patent
Wheeler

(10) Patent No.: US 10,845,820 B2
(45) Date of Patent: Nov. 24, 2020

(54) ROUTE GENERATION USING HIGH DEFINITION MAPS FOR AUTONOMOUS VEHICLES

(71) Applicant: DeepMap Inc., Palo Alto, CA (US)

(72) Inventor: Mark Damon Wheeler, Saratoga, CA (US)

(73) Assignee: DEEPMAP INC., Palo Alto, CA (US)

( * ) Notice: Subject to any disclaimer, the term of this patent is extended or adjusted under 35 U.S.C. 154(b) by 293 days.

(21) Appl. No.: 15/853,614

(22) Filed: Dec. 22, 2017

(65) Prior Publication Data

US 2018/0188743 A1     Jul. 5, 2018

Related U.S. Application Data

(60) Provisional application No. 62/441,078, filed on Dec. 30, 2016.

(51) Int. Cl.
    *G05D 1/02*         (2020.01)
    *G08G 1/0969*     (2006.01)
    (Continued)

(52) U.S. Cl.
    CPC ........... *G05D 1/0274* (2013.01); *G01C 21/30* (2013.01); *G01C 21/32* (2013.01);
    (Continued)

(58) Field of Classification Search
    CPC ............... G05D 1/0274; G05D 1/0276; G05D 2201/0213; G01C 21/32; G01C 21/3658;
    (Continued)

(56) References Cited

U.S. PATENT DOCUMENTS

| 3,652,836 A | * | 3/1972 | Richardson | G01S 1/02 701/410 |
| 6,175,803 B1 | * | 1/2001 | Chowanic | G01C 21/34 340/988 |

(Continued)

OTHER PUBLICATIONS

United States Office Action, U.S. Appl. No. 15/853,633, dated Feb. 8, 2019, 13 pages.

(Continued)

*Primary Examiner* — Frederick M Brushaber
(74) *Attorney, Agent, or Firm* — Maschoff Brennan

(57) ABSTRACT

A system generates a high definition map for an autonomous vehicle to travel from a source location to a destination location. The system determines a low resolution route and receives high definition map data for a set of geographical regions overlaying the low resolution route. The system uses lane elements within the geographical regions to form a set of potential partial routes. The system calculates the error between the potential partial route and the low resolution route and removes potential partial routes with errors above the threshold. Once completed, the system selects a final route and sends signals to the controls of the autonomous vehicle to follow the final route. The system determines whether surface areas adjacent to a lane that are not part of the road are safe for the vehicle to drive in case of emergency. The system stores information describing navigable surface areas with representations of lanes.

20 Claims, 18 Drawing Sheets

(51) Int. Cl.

| | | |
|---|---|---|
| *G08G 1/01* | (2006.01) | |
| *G08G 1/04* | (2006.01) | |
| *G01C 21/32* | (2006.01) | |
| *G06F 16/29* | (2019.01) | |
| *G08G 1/0968* | (2006.01) | |
| *G06F 16/901* | (2019.01) | |
| *G06F 16/9537* | (2019.01) | |
| *G01C 21/30* | (2006.01) | |
| *G01C 21/36* | (2006.01) | |

(52) U.S. Cl.
CPC ....... *G01C 21/3658* (2013.01); *G05D 1/0276* (2013.01); *G06F 16/29* (2019.01); *G06F 16/9024* (2019.01); *G06F 16/9537* (2019.01); *G08G 1/0112* (2013.01); *G08G 1/0129* (2013.01); *G08G 1/0141* (2013.01); *G08G 1/04* (2013.01); *G08G 1/0969* (2013.01); *G08G 1/09685* (2013.01); *G08G 1/096822* (2013.01); *G05D 2201/0213* (2013.01)

(58) Field of Classification Search
CPC ...... G01C 21/30; G08G 1/09685; G08G 1/04; G08G 1/0141; G08G 1/0969; G08G 1/096822; G08G 1/0129; G08G 1/0112; G06F 16/9537; G06F 16/9024; G06F 16/29
See application file for complete search history.

(56) References Cited

U.S. PATENT DOCUMENTS

| | | | |
|---|---|---|---|
| 6,370,475 B1 | 4/2002 | Breed et al. | |
| 8,977,487 B2* | 3/2015 | Doi | G01C 21/3446 |
| | | | 701/411 |
| 8,994,591 B2* | 3/2015 | Dupray | H04W 4/90 |
| | | | 342/457 |
| 9,989,967 B2 | 6/2018 | Jacobus et al. | |
| 2007/0118286 A1* | 5/2007 | Wang | G01S 19/26 |
| | | | 342/357.59 |
| 2007/0232310 A1* | 10/2007 | Schiff | H04W 52/46 |
| | | | 455/436 |
| 2007/0255521 A1* | 11/2007 | Chung | G01C 25/005 |
| | | | 702/147 |
| 2008/0074318 A1* | 3/2008 | Trautenberg | G01S 19/08 |
| | | | 342/357.45 |
| 2009/0254276 A1* | 10/2009 | Faulkner | G01C 21/16 |
| | | | 701/469 |
| 2010/0106356 A1 | 4/2010 | Trepagnier et al. | |
| 2010/0253540 A1 | 10/2010 | Seder et al. | |
| 2011/0295896 A1* | 12/2011 | Klein | G06F 16/2468 |
| | | | 707/780 |
| 2014/0297116 A1* | 10/2014 | Anderson | B60G 11/265 |
| | | | 701/37 |
| 2015/0117723 A1 | 4/2015 | Joshi et al. | |
| 2015/0210274 A1 | 7/2015 | Clarke et al. | |
| 2015/0244269 A1* | 8/2015 | Yu | H02M 1/44 |
| | | | 323/284 |
| 2015/0354976 A1 | 12/2015 | Ferencz et al. | |
| 2016/0054135 A1 | 2/2016 | Fowe | |
| 2017/0017592 A1* | 1/2017 | Kato | G06F 13/36 |
| 2018/0034727 A1* | 2/2018 | Nainar | H04L 45/52 |
| 2018/0188742 A1 | 7/2018 | Wheeler | |
| 2019/0311616 A1* | 10/2019 | Jin | G08G 1/096783 |

OTHER PUBLICATIONS

PCT Invitation to Pay Additional Fees, PCT Application No. PCT/US17/68351, Mar. 5, 2018, 2 pages.
PCT International Search Report and Written Opinion, PCT Application No. PCT/US17/68351, dated May 1, 2018, 18 pages.

* cited by examiner

ROUTE GENERATION USING HIGH DEFINITION MAPS FOR AUTONOMOUS VEHICLES

CROSS REFERENCE TO RELATED APPLICATIONS

This application claims the benefit of priority under 35 USC 119(e) to U.S. Provisional Application No. 62/441,078 entitled "Improved Routing for Using High Definition Maps in Vehicles," filed on Dec. 30, 2016, which is incorporated herein by reference in its entirety for all purposes.

BACKGROUND

This disclosure relates generally to generating routes for vehicles in general, and more particularly to generating accurate routes based on high definition maps with high precision for safe navigation of autonomous vehicles.

Autonomous vehicles, also known as self-driving cars, driverless cars, auto, or robotic cars, drive from a source location to a destination location without requiring a human driver to control and navigate the vehicle. Automation of driving is difficult due to several reasons. For example, autonomous vehicles use sensors to make driving decisions on the fly, but vehicle sensors cannot observe everything all the time. Vehicle sensors can be obscured by corners, rolling hills, and other vehicles. Vehicles sensors may not observe certain things early enough to make decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed.

Autonomous vehicles can use map data to figure out some of the above information with high confidence instead of relying on less-reliable sensor data. However conventional maps have several drawbacks that make them difficult to use for an autonomous vehicle. To be useful, the geometry of the map and the ability of the vehicle to determine its location in the map needs to be highly accurate (e.g., 10 cm or less). Conventional maps do not provide the level of accuracy required for safe navigation. GPS systems provide accuracies of approximately 3-5 meters, but have large error conditions resulting in an accuracy of over 100 m which occur frequently depending on environmental conditions. This makes it challenging to accurately determine the location of the vehicle with a conventional map and GPS.

Furthermore, conventional maps are created by survey teams that use drivers with specially outfitted cars with high resolution sensors that drive around a geographic region and take measurements. The measurements are taken back and a team of map editors assembles the map from the measurements. This process is expensive and time consuming (e.g., taking possibly months to complete a map). Therefore, maps assembled using such techniques do not have fresh data. For example, roads are updated/modified on a frequent basis roughly 5-10% per year. But survey cars are expensive and limited in number, so cannot capture most of these updates. For example, a survey fleet may include a thousand cars. For even a single state in the United States, a thousand cars would not be able to keep the map up-to-date on a regular basis to allow safe self-driving. As a result, conventional techniques of maintaining maps are unable to provide the right data that is sufficiently accurate and up-to-date for safe navigation of autonomous vehicles.

SUMMARY

A vehicle computing system generates a high definition map for an autonomous vehicle to travel from a source address to a destination address using information from an online system. The information provided by the online system may include geographical regions overlaying the route of the low resolution map and lane elements describing the traffic fixtures within those geographical regions. The lane elements are created to form a connected graph which indicates physically possible navigation paths through the map. The vehicle computing system analyzes the lane element graph and allows the resolution route to produce a number of potential partial routes, or route hypotheses (e.g., partial routes from a start to some intermediate point before an endpoint). The vehicle computing system develops these potential partial routes by iteratively adding additional lane elements to the potential partial routes with the lowest error until a complete potential partial route is found. The error can be computed as a maximum deviation between the high resolution route and the low resolution route. When a potential route eventually includes the final destination or endpoint (e.g., a potential completed route), this can provide an upper bound on the error for the high resolution lane element route. Other possible potential routes whose error exceeds that upper bound can be discarded. If the remaining potential routes have an error larger than the upper bound, then the search is complete (i.e., this is the final route, which runs from the start to the endpoint). If some incomplete potential routes have error lower than the upper bound, the system can continue to search along those until it either reaches the destination lane element or the error exceeds the upper bound. The system thus looks for the best possible completed route as defined by the error measure (e.g., maximum distance between the low and high resolution routes).

In an embodiment, the vehicle computing system receives a low resolution route from a third-party service and sends that route to an online system. From the online system, the vehicle computing system receives a representation of a lane element graph describing traffic features within a set of geographical regions overlaying the low resolution route. Based on the lane element graph, the vehicle computing system determines a set of potential partial route from the source address to the destination address. For each potential partial route, additional connected lane elements are identified and a measure of error is calculated between the potential partial route and the low resolution route. In an embodiment, potential partial routes with errors above a threshold value are removed from consideration by the vehicle computing system.

In an embodiment, of the complete routes from the source address to the destination address, the vehicle computing system selects a final route and sends signals to the controls of the autonomous vehicle to traverse the final route.

Figure 1:
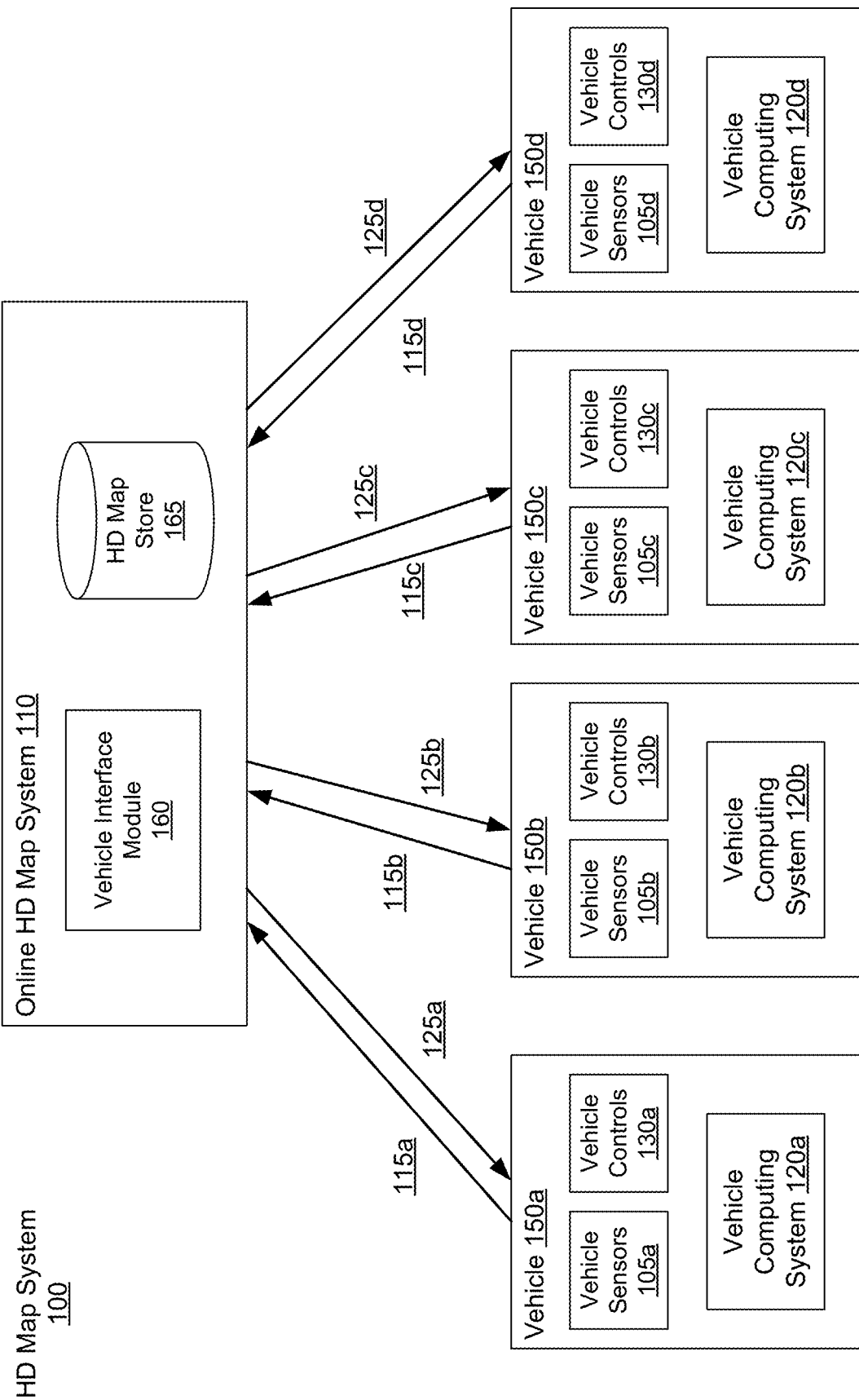
FIG. 1 shows the overall system environment of an HD map system interacting with multiple vehicle computing systems, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the invention maintain high definition (HD) maps containing up to date information using high precision. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." High definition maps provide the high geometric accuracy plus additional information that allows the vehicle to identify its position in the map with similar accuracy. An HD map refers to a map storing data with very high precision, typically 5-10 cm. Embodiments generate HD maps containing spatial geometric information about the roads on which an autonomous vehicle can travel. Accordingly, the generated HD maps include the information necessary for an autonomous vehicle navigating safely without human intervention. Instead of collecting data for the HD maps using an expensive and time consuming mapping fleet process including vehicles outfitted with high resolution sensors, embodiments of the invention use data from the lower resolution sensors of the self-driving vehicles themselves as they drive around through their environments. The vehicles may have no prior map data for these routes or even for the region. Embodiments of the invention provide location as a service (LaaS) such that autonomous vehicles of different manufacturers can each have access to the most up-to-date map information created via these embodiments of invention.

Embodiments generate and maintain high definition (HD) maps that are accurate and include the most updated road conditions for safe navigation. For example, the HD maps provide the current location of the autonomous vehicle relative to the lanes of the road precisely enough to allow the autonomous vehicle to drive safely in the lane.

HD maps store a very large amount of information, and therefore face challenges in managing the information. For example, an HD map for a large geographical region may not fit on the local storage of a vehicle. Embodiments of the invention provide the necessary portion of an HD map to an autonomous vehicle that allows the vehicle to determine its current location in the HD map, determine the features on the road relative to the vehicle's position, determine if it is safe to move the vehicle based on physical constraints and legal constraints, etc. Examples of physical constraints include physical obstacles, such as walls, and examples of legal constraints include legally allowed direction of travel for a lane, speed limits, yields, stops.

Embodiments of the invention allow safe navigation for an autonomous vehicle by providing high latency, for example, 10-20 milliseconds or less for providing a response to a request; high accuracy in terms of location, i.e., accuracy within 10 cm or less; freshness of data by ensuring that the map is updated to reflect changes on the road within a reasonable time frame; and storage efficiency by minimizing the storage needed for the HD Map.

General System Architecture

FIG. 1 shows the overall system environment of an HD map system interacting with multiple vehicles, according to an embodiment. The HD map system 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
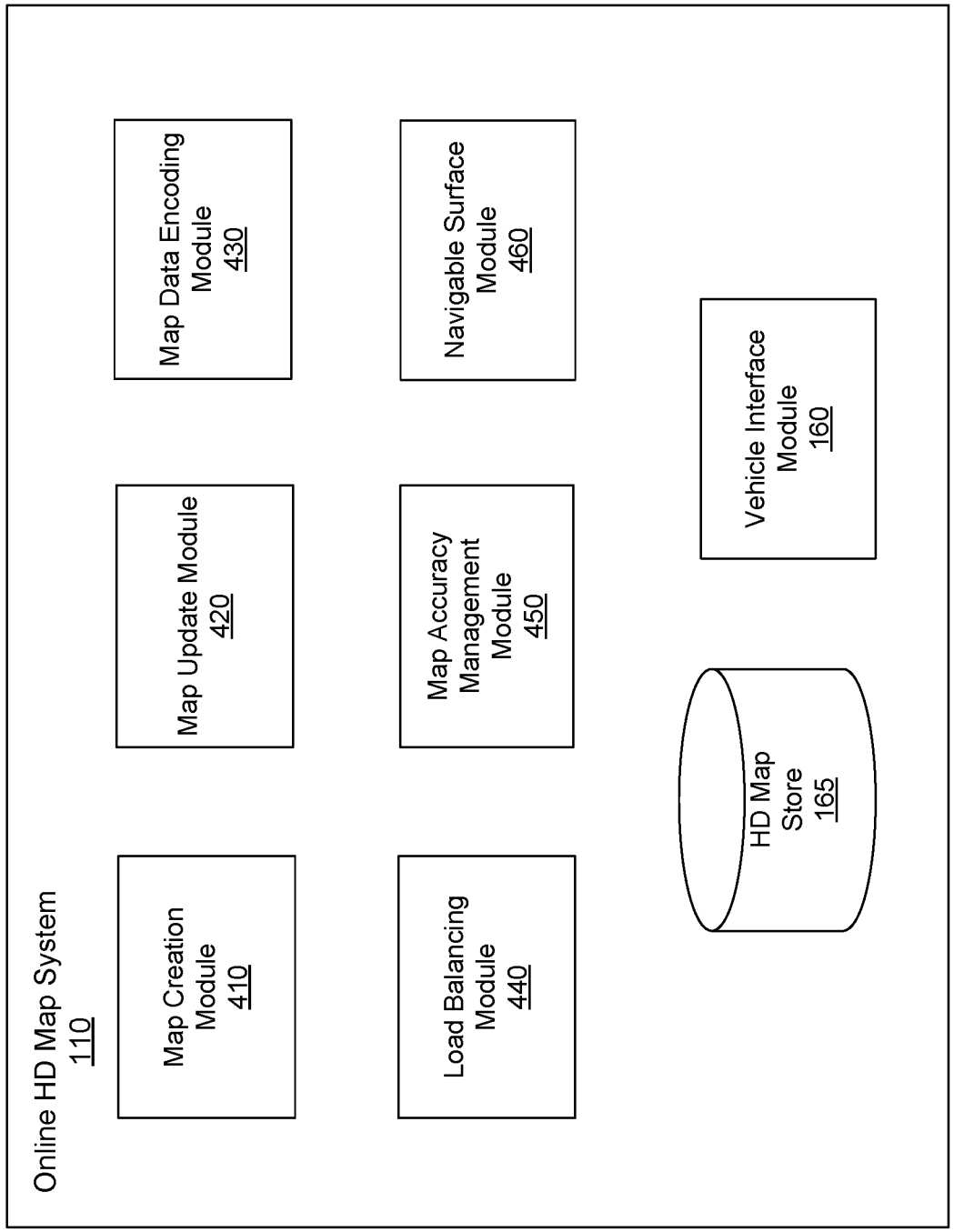
FIG. 4 shows the system architecture of an online HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 4 and further described herein.

The online HD map system 110 receives 115 data collected by sensors of a plurality of vehicles 150, for example, hundreds or thousands of cars. The vehicles provide sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being traveled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. The online HD map system 110 receives from various vehicles, information describing the data that is stored at the local HD map store 275 of the vehicle. If the online HD map system 110 determines that the vehicle does not have certain portion of the HD map stored locally in the local HD map store 275, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (LIDAR), a global positioning system (GPS) navigation system, an inertial measurement unit (IMU), and others. The vehicle has one or more cameras that capture images of the surroundings of the vehicle. A LIDAR surveys the surroundings of the vehicle by measuring distance to a target by illuminating that target with a laser light pulses, and measuring the reflected pulses. The GPS navigation system determines the position of the vehicle based on signals from satellites. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated in FIG. 2 and further described in connection with FIG. 2.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
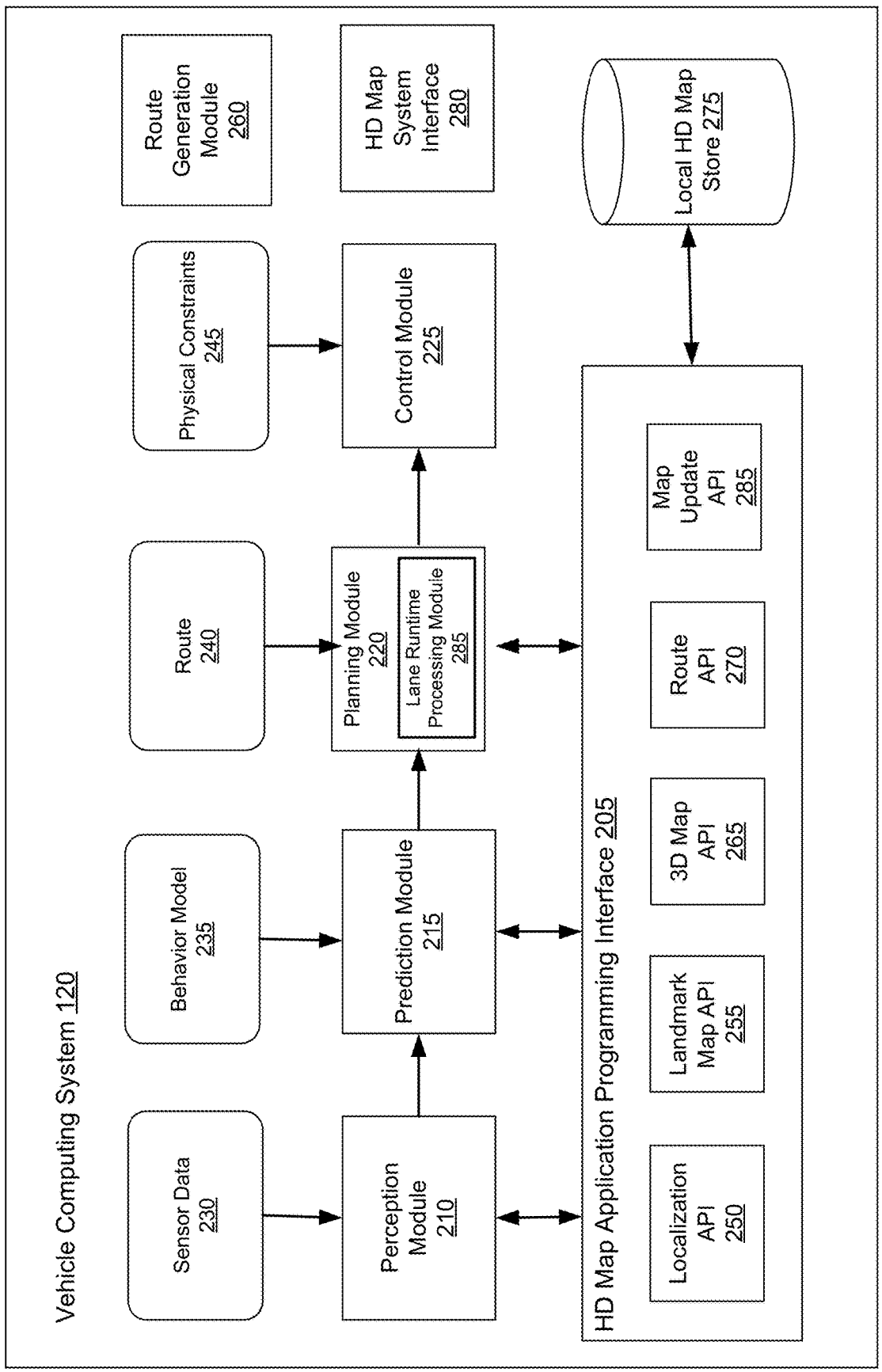
FIG. 2 shows the system architecture of a vehicle computing system, according to an embodiment.

FIG. 2 shows the system architecture of a vehicle computing system, according to an embodiment. The vehicle computing system 120 comprises a perception module 210, prediction module 215, planning module 220, a control module 225, a local HD map store 275, an HD map system interface 280, a route generation module 260, and an HD map application programming interface (API) 205. The various modules of the vehicle computing system 120 process various type of data including sensor data 230, a behavior model 235, routes 240, and physical constraints 245. In other embodiments, the vehicle computing system 120 may have more or fewer modules. Functionality described as being implemented by a particular module may be implemented by other modules.

The perception module 210 receives sensor data 230 from the sensors 105 of the vehicle 150. This includes data collected by cameras of the car, LIDAR, IMU, GPS navigation system, and so on. The perception module 210 uses the sensor data to determine what objects are around the vehicle, the details of the road on which the vehicle is travelling, and so on. The perception module 210 processes the sensor data 230 to populate data structures storing the sensor data and provides the information to the prediction module 215.

The prediction module 215 interprets the data provided by the perception module using behavior models of the objects perceived to determine whether an object is moving or likely to move. For example, the prediction module 215 may determine that objects representing road signs are not likely to move, whereas objects identified as vehicles, people, and so on, are either moving or likely to move. The prediction module 215 uses the behavior models 235 of various types of objects to determine whether they are likely to move. The prediction module 215 provides the predictions of various objects to the planning module 220 to plan the subsequent actions that the vehicle needs to take next.

The planning module 220 receives the information describing the surroundings of the vehicle from the prediction module 215, the route 240 that determines the destination of the vehicle, and the path that the vehicle should take to get to the destination. The planning module 220 uses the information from the prediction module 215 and the route 240 to plan a sequence of actions that the vehicle needs to take within a short time interval, for example, within the next few seconds. In an embodiment, the planning module 220 specifies the sequence of actions as one or more points representing nearby locations that the vehicle needs to drive through next. The planning module 220 provides the details of the plan comprising the sequence of actions to be taken by the vehicle to the control module 225. The plan may determine the subsequent action of the vehicle, for example, whether the vehicle performs a lane change, a turn, acceleration by increasing the speed or slowing down, and so on. To process real-time data from the surroundings of the vehicle, the planning module 220 further includes a lane runtime processing module 285 to determine whether the vehicle can safely cross lane boundaries and travel over surfaces outside of the lane boundaries. Navigating lane boundaries is further described below in reference to FIG. 9A-B. In one embodiment, based on the surroundings of the autonomous vehicle, the prediction module 215 detects an emergency that would force the autonomous vehicle out of a lane and notifies the planning module 220 of the emergency. The lane runtime processing module determines that the vehicle can safely travel outside of the lane boundaries and signals to the control module 225.

The control module 225 determines the control signals for sending to the controls 130 of the vehicle based on the plan received from the planning module 220. For example, if the vehicle is currently at point A and the plan specifies that the vehicle should next go to a nearby point B, the control module 225 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 225 also receives physical constraints 245 as input. These include the physical capabilities of that specific vehicle. For example, a car having a particular make and model may be able to safely make certain types of vehicle movements such as acceleration, and turns that another car with a different make and model may not be able to make safely. The control module 225 incorporates these physical constraints in determining the control signals. The control module 225 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 210, prediction module 215, and planning module 220 receive map information to perform their respective computation. The vehicle 100 stores the HD map data in the local HD map store 275. The modules of the vehicle computing system 120 interact with the map data using the HD map API 205 that provides a set of application programming interfaces (APIs) that can be invoked by a module for accessing the map information. The HD map system interface 280 allows the vehicle computing system 120 to interact with the online HD map system 110 via a network (not shown in the Figures). The local HD map store 275 stores map data in a format specified by the HD Map system 110. The HD map API 205 is capable of processing the map data format as provided by the HD Map system 110. The HD Map API 205 provides the vehicle computing system 120 with an interface for interacting with the HD map data. The HD map API 205 includes several APIs including the localization API 250, the landmark map API 255, the route API 265, the 3D map API 270, the map update API 285, and so on.

The localization APIs 250 determine the current location of the vehicle, for example, when the vehicle starts and as the vehicle moves along a route. The localization APIs 250 include a localize API that determines an accurate location of the vehicle within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, LIDAR scanner data, and camera images. The localize API returns an accurate location of the vehicle as latitude and longitude coordinates. The coordinates returned by the localize API are more accurate compared to the GPS coordinates used as input, for example, the output of the localize API may have precision range from 5-10 cm. In one embodiment, the vehicle computing system 120 invokes the localize API to determine location of the vehicle periodically based on the LIDAR using scanner data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 250 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 255 provides the geometric and semantic description of the world around the vehicle, for example, description of various portions of lanes that the vehicle is currently travelling on. The landmark map APIs 255 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify a distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 265 provides efficient access to the spatial 3-dimensional (3D) representation of the road and various physical objects around the road as stored in the local HD map store 275. The 3D map APIs 265 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs 265 also include map update APIs 285, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 270 returns route information including full route between a source and destination and portions of route as the vehicle travels along the route. The 3D map API 265 allows querying the HD Map. The route APIs 270 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its 14L value, and makes sure that the HD map data for the route stored in the vehicle computing system 120 is up to date. The get-planned-routes API returns a list of planned routes and provides information describing a route identified by a route identifier.

The map update API 285 manages operations related to update of map data, both for the local HD map store 275 and for the HD map store 165 stored in the online HD map system 110. Accordingly, modules in the vehicle computing system 120 invoke the map update API 285 for downloading data from the online HD map system 110 to the vehicle computing system 120 for storing in the local HD map store 275 as necessary. The map update API 285 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

Figure 15:
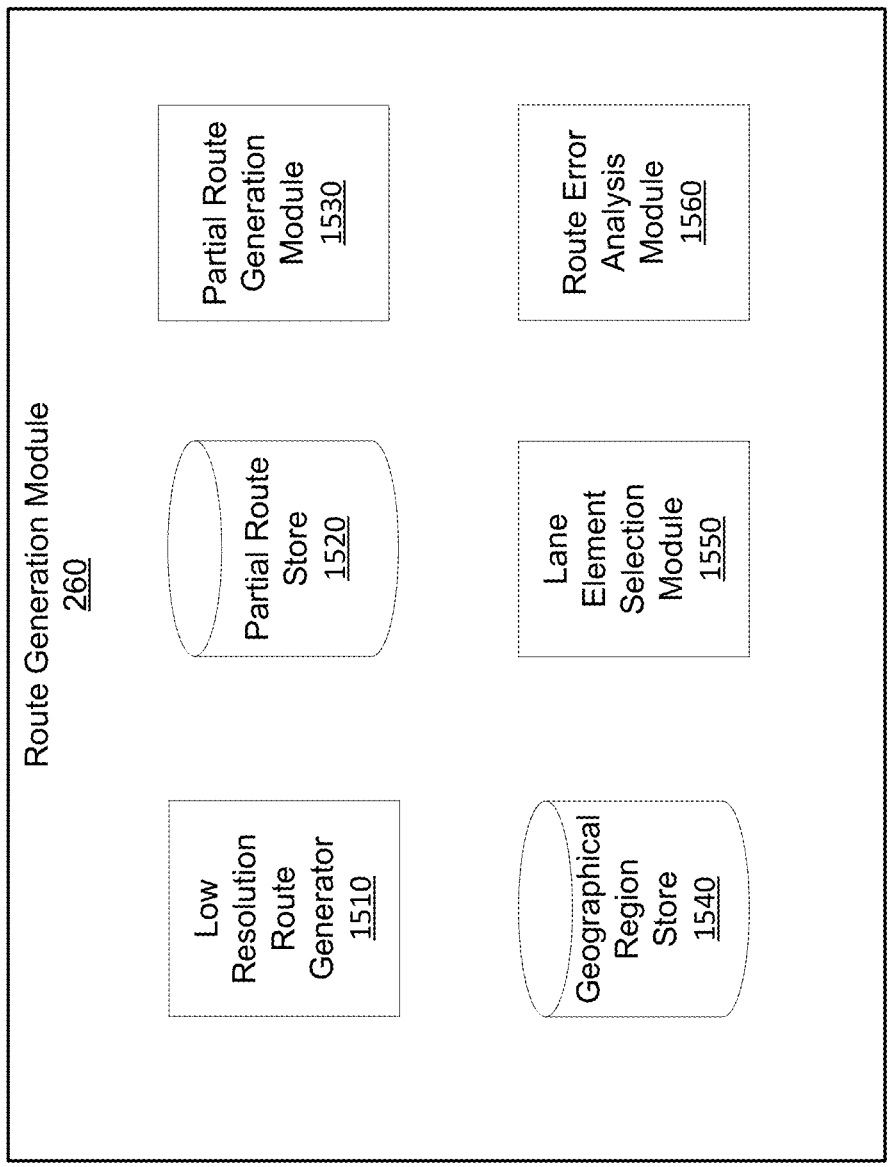
FIG. 15 illustrates a system architecture of the route generation module, according to an embodiment.

The route generation module 260 computes and determines the optimal route traversing from a source address (or source location) to a destination address (or destination location). Details of the route generation module are shown in FIG. 15 described in relation with FIG. 16. Some functionality of the route generation module 260 may be performed in the online HD map system 110. Accordingly, the online HD map system 110 may store a corresponding route generation module 260 that interacts with the route generation module 260 stored in the vehicle computing system 120.

FIG. 4, described below, further illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different compute platforms with autonomous driving capabilities, for example, collection and analysis of vehicle sensor data. Examples of compute platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several compute platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

Figure 3:
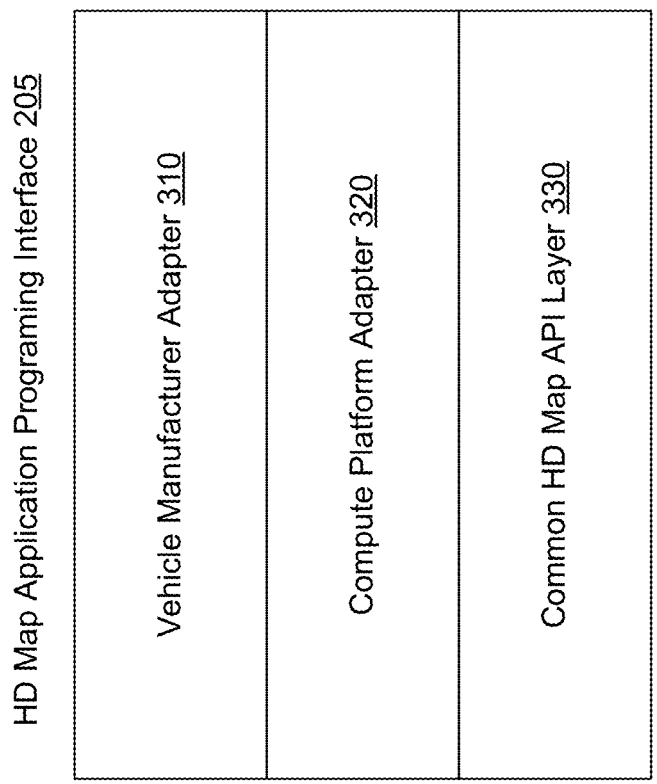
FIG. 3 illustrates the various layers of instructions in the HD Map API of a vehicle computing system, according to an embodiment.

As shown in FIG. 3, in an embodiment, the HD map API 205 is implemented as a library that includes a vehicle manufacturer adapter 310, a compute platform adapter 320, and a common HD map API layer 330. The common HD map API layer 330 comprises generic instructions that can be used across a plurality of vehicle compute platforms and vehicle manufacturers. The compute platform adapter 320 include instructions that are specific to each computer platform. For example, the common HD Map API layer 330 may invoke the compute platform adapter 320 to receive data from sensors supported by a specific compute platform. The vehicle manufacturer adapter 310 comprises instructions specific to a vehicle manufacturer. For example, the common HD map API layer 330 may invoke functionality provided by the vehicle manufacturer adapter 310 to send specific control instructions to the vehicle controls 130.

The online HD map system 110 stores compute platform adapters 320 for a plurality of compute platforms and vehicle manufacturer adapters 310 for a plurality of vehicle manufacturers. The online HD map system 110 determines the particular vehicle manufacturer and the particular compute platform for a specific autonomous vehicle. The online HD map system 110 selects the vehicle manufacturer adapter 310 for the particular vehicle manufacturer and the compute platform adapter 320 the particular compute platform of that specific vehicle. The online HD map system 110 sends instructions of the selected vehicle manufacturer adapter 310 and the selected compute platform adapter 320 to the vehicle computing system 120 of that specific autonomous vehicle. The vehicle computing system 120 of that specific autonomous vehicle installs the received vehicle manufacturer adapter 310 and the compute platform adapter 320. The vehicle computing system 120 periodically checks if the online HD map system 110 has an update to the installed vehicle manufacturer adapter 310 and the compute platform adapter 320. If a more recent update is available compared to the version installed on the vehicle, the vehicle computing system 120 requests and receives the latest update and installs it.

HD Map System Architecture

FIG. 4 shows the system architecture of an HD map system, according to an embodiment. The online HD map system 110 comprises a map creation module 410, a map update module 420, a map data encoding module 430, a load balancing module 440, a map accuracy management module 450, a vehicle interface module 160, and a HD map store 165. Other embodiments of online HD map system 110 may include more or fewer modules than shown in FIG. 4. Functionality indicated as being performed by a particular module may be implemented by other modules. In an embodiment, the online HD map system 110 may be a distributed system comprising a plurality of processors.

The map creation module 410 creates the map from map data collected from several vehicles that are driving along various routes. The map update module 420 updates previously computed map data by receiving more recent information from vehicles that recently traveled along routes on which map information changed. For example, if certain road signs have changed or lane information has changed as a result of construction in a region, the map update module 420 updates the maps accordingly. The map data encoding module 430 encodes map data to be able to store the data efficiently as well as send the required map data to vehicles 150 efficiently. The load balancing module 440 balances load across vehicles to ensure that requests to receive data from vehicles are uniformly distributed across different vehicles. The map accuracy management module 450 maintains high accuracy of the map data using various techniques even though the information received from individual vehicles may not have high accuracy.

Figure 5:
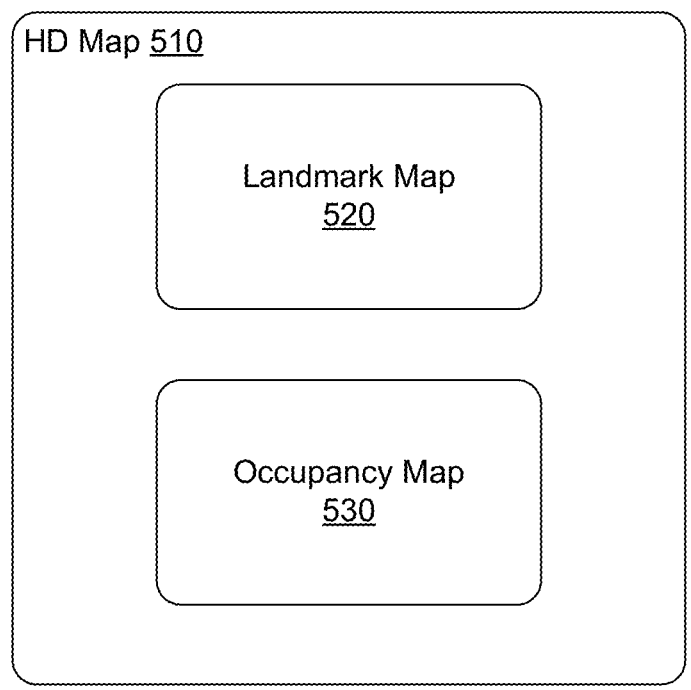
FIG. 5 illustrates the components of an HD map, according to an embodiment.

FIG. 5 illustrates the components of an HD map, according to an embodiment. The HD map comprises maps of several geographical regions. The HD map 510 of a geographical region comprises a landmark map (LMap) 520 and an occupancy map (OMap) 530. The landmark map comprises information describing lanes including spatial location of lanes and semantic information about each lane. The spatial location of a lane comprises the geometric location in latitude, longitude and elevation at high prevision, for example, at or below 10 cm precision. The semantic information of a lane comprises restrictions such as direction, speed, type of lane (for example, a lane for going straight, a left turn lane, a right turn lane, an exit lane, and the like), restriction on crossing to the left, connectivity to other lanes and so on. The landmark map may further comprise information describing stop lines, yield lines, spatial location of crosswalks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on.

The occupancy map 530 comprises spatial 3-dimensional (3D) representation of the road and all physical objects around the road. The data stored in an occupancy map 530 is also referred to herein as occupancy grid data. The 3D representation may be associated with a confidence score indicative of a likelihood of the object existing at the location. The occupancy map 530 may be represented in a number of other ways. In one embodiment, the occupancy map 530 is represented as a 3D mesh geometry (collection of triangles) which covers the surfaces. In another embodiment, the occupancy map 530 is represented as a collection of 3D points which cover the surfaces. In another embodiment, the occupancy map 530 is represented using a 3D volumetric grid of cells at 5-10 cm resolution. Each cell indicates whether or not a surface exists at that cell, and if the surface exists, a direction along which the surface is oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD Map does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The online HD map system 110 divides a physical area into geographical regions and stores a separate representation of each geographical region. Each geographical region represents a continuous physical area bounded by a geometric shape, for example, a square, a rectangle, a quadrilateral or a general polygon. In an embodiment, the online HD map system 110 divides a physical area into geographical regions of the same size independent of the amount of data required to store the representation of each geographical region. In another embodiment, the online HD map system 110 divides a physical area into geographical regions of different sizes based on the amount of data required to represent the geographical region. Examples of data required to represent the region include but are not limited to a geometric area encompassed by the region, a concentration of traffic features in the region, or a population density in the region. As mentioned, in some embodiments, geographical regions are divided based on their concentrations of traffic features. For example, a physical area with a large number of traffic features may be divided into multiple geographical regions, whereas a physical area of the same size with fewer traffic features may be represented as a single geographical region. Traffic features include, but are not limited to, one or more traffic signs, one or more traffic lights, one or more driving lanes, and one or more changes in speed limit.

In some embodiments, a combination of traffic features may not only describe the concentration of features of the geographical region, but also the complexity of region. For example, a region containing multiple streets with, changes in speed limits may have fewer traffic features than a second region with the same amount of streets, but no changes in speed limits but more traffic lights. In this instance, the second street may be more concentrated, but the first street is more complex causing the region to be physically smaller than the second region. In some embodiments, the relative complexity ranking between features may differ between HD maps. Accordingly, in this embodiment, the online HD map system 110 determines the size of a geographical region based on an estimate of an amount of data required to store the various elements of the physical area relevant for the generation of an HD map.

In an embodiment, the online HD map system 110 represents a geographical region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6A:
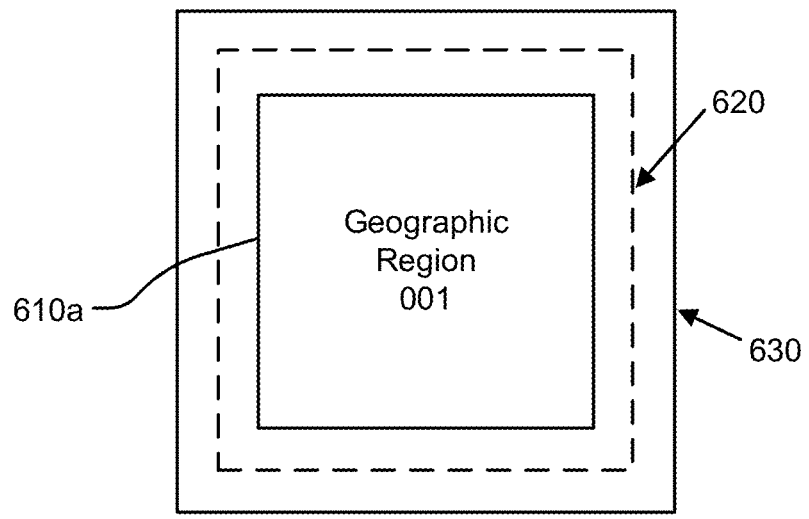
FIGS. 6A-B illustrate geographical regions defined in an HD map, according to an embodiment.
Figure 6B:
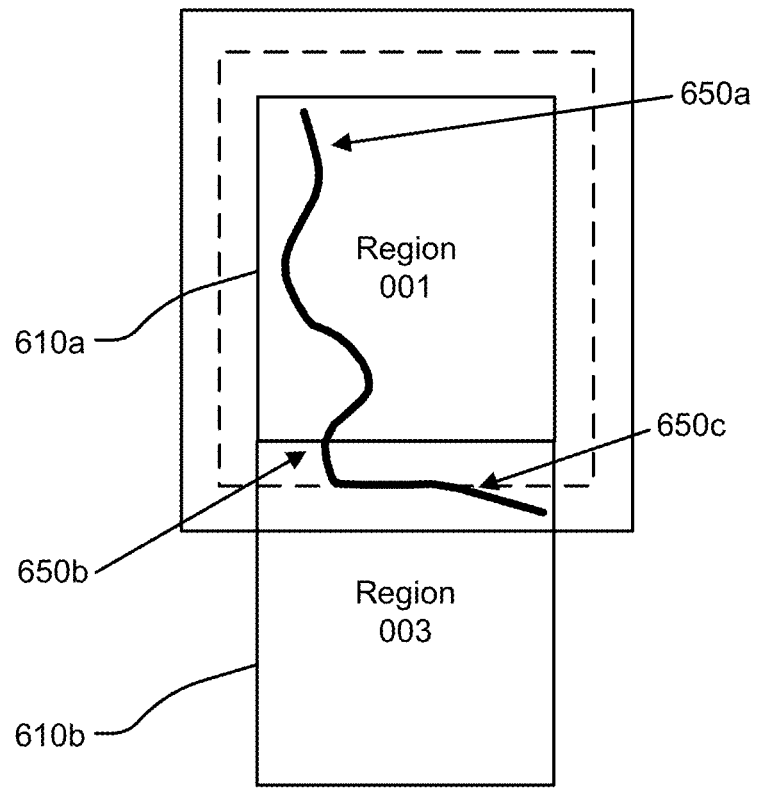

FIGS. 6A-B illustrate geographical regions defined in an HD map, according to an embodiment. FIG. 6A shows a square geographical region 610a. In other embodiments, the geographical regions may divided into different shapes of tiles. FIG. 6B shows two neighboring geographical regions 610a and 610b. The online HD map system 110 stores data in a representation of a geographical region that allows for smooth transition from one geographical region to another as a vehicle drives across geographical region boundaries.

According to an embodiment, as illustrated in FIG. 6, each geographical region has a buffer of a predetermined width around it. The buffer comprises redundant map data around all 4 sides of a geographical region (in the case that the geographical region is bounded by a rectangle). FIG. 6A shows a boundary 620 for a buffer of 50 meters around the geographical region 610a and a boundary 630 for buffer of 100 meters around the geographical region 610a. The vehicle computing system 120 switches the current geographical region of a vehicle from one geographical region to the neighboring geographical region when the vehicle crosses a threshold distance within this buffer. For example, as shown in FIG. 6B, a vehicle starts at location 650a in the geographical region 610a. The vehicle traverses along a route to reach a location 650b where it cross the boundary of the geographical region 610 but stays within the boundary 620 of the buffer. Accordingly, the vehicle computing system 120 continues to use the geographical region 610a as the current geographical region of the vehicle. Once the vehicle crosses the boundary 620 of the buffer at location 650c, the vehicle computing system 120 switches the current geographical region of the vehicle to geographical region 610b from 610a. The use of a buffer prevents rapid switching of the current geographical region of a vehicle as a result of the vehicle travelling along a route that closely tracks a boundary of a geographical region.

Lane Representations in HD Maps

The HD map system 100 represents lane information of streets in HD maps. Although the embodiments described herein refer to streets, the techniques are applicable to highways, alleys, avenues, boulevards, or any other path on which vehicles can travel. The HD map system 100 uses lanes as a reference frame for purposes of routing and for localization of a vehicle. The lanes represented by the HD map system 100 include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane. The HD map system 100 also stores information relative to lanes, for example, landmark features such as road signs and traffic lights relative to the lanes, occupancy grids relative to the lanes for obstacle detection, and navigable spaces relative to the lanes so the vehicle can efficiently plan/react in emergencies when the vehicle must make an unplanned move out of the lane. Accordingly, the HD map system 100 stores a representation of a network of lanes to allow a vehicle to plan a legal path between a source and a destination and to add a frame of reference for real time sensing and control of the vehicle. The HD map system 100 stores information and provides APIs that allow a vehicle to determine the lane that the vehicle is currently in, the precise vehicle location relative to the lane geometry, and all relevant features/data relative to the lane and adjoining and connected lanes.

Figure 7:
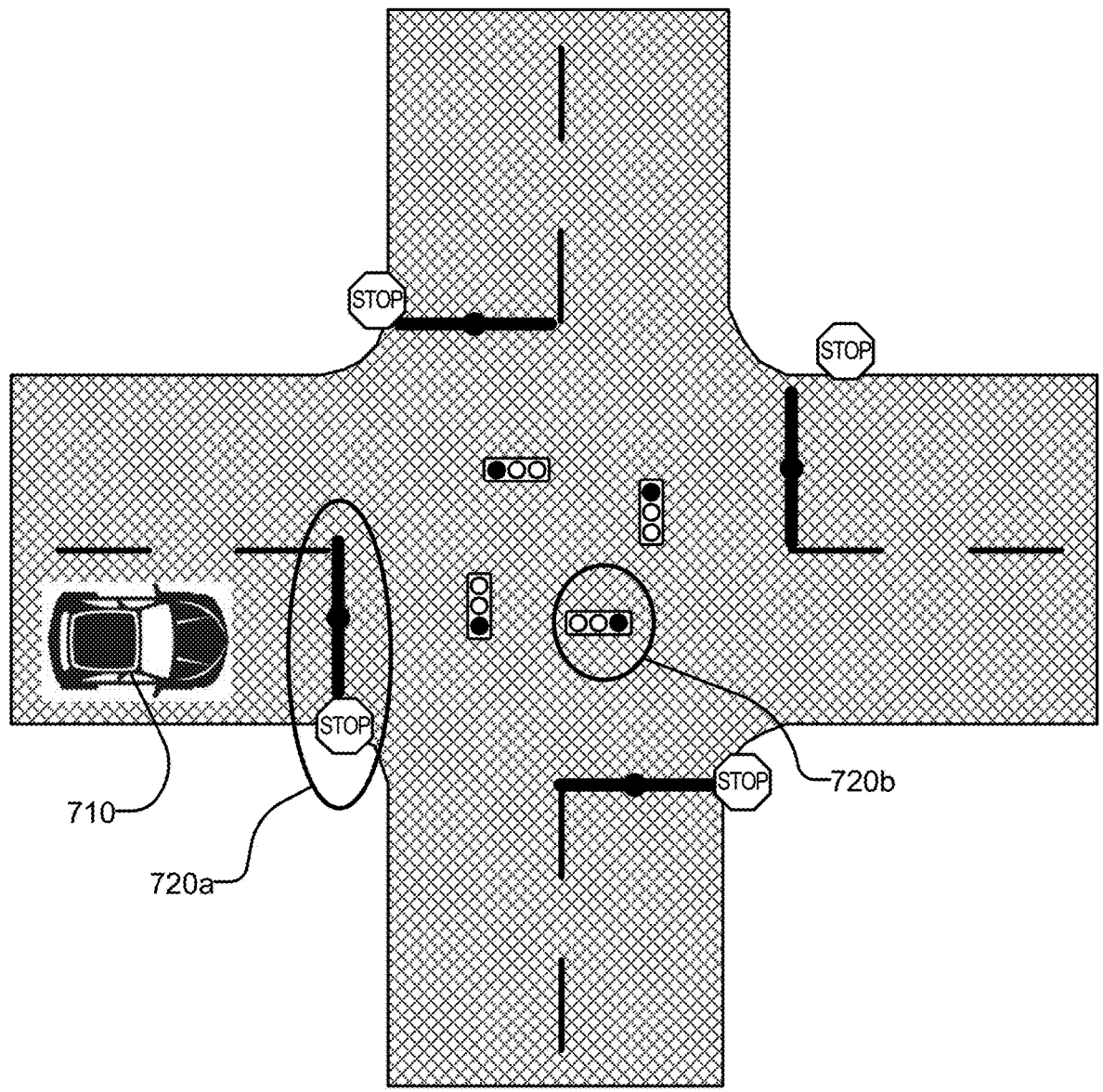
FIG. 7 illustrates representations of lanes in an HD map, according to an embodiment.

FIG. 7 illustrates lane representations in an HD map, according to an embodiment. FIG. 7 shows a vehicle 710 at a traffic intersection. The HD map system provides the vehicle with access to the map data that is relevant for autonomous driving of the vehicle. This includes, for example, features 720a and 720b that are associated with the lane but may not be the closest features to the vehicle. Therefore, the HD map system 100 stores a lane-centric representation of data that represents the relationship of the lane to the feature so that the vehicle can efficiently extract the features given a lane.

The HD map system 100 represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 100 represents a lane element as a continuous geometric portion of a single vehicle lane. The HD map system 100 stores objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations and so on.

Examples of lane elements represented by the HD map system 100 include, a piece of a right lane on a freeway, a piece of a lane on a road, a left turn lane, the turn from a left turn lane into another lane, a merge lane from an on-ramp an exit lane on an off-ramp, and a driveway. The HD map system 100 represents a one lane road using two lane elements, one for each direction. The HD map system 100 represents median turn lanes that are shared similar to a one-lane road.

As described above lane elements are stored as pieces of an aggregated lane element graph. Within the lane element graph, individual lane elements are represented as nodes on the graph connected by edges to other nodes, representing neighboring lane elements of the graph. The edges connecting two lane elements indicate physical connection between two lane elements that a vehicle can legally traverse. For example, an edge between two lane elements may represent a dashed white line over which vehicles can change lanes, but may not represent a median over which vehicles not legally cross. In some embodiments, boundaries between lane lines over which cars cannot cross have a representation distinct from the above edges of the lane element graph. Additionally, within geographical regions, lane elements transition from a current lane element to one or more subsequent lane elements, and a lane element can be connected to multiple outgoing lane elements, for example at an intersection where a vehicle may turn left, turn right, or continue straight from their current lane (each of these are lane elements). Similarly, crossing the boundary of two geographical regions and transitioning from the current geographical region to an adjacent one, the lane element of the current geographical region also transitions to the connecting lane element with the adjacent geographical region.

Figure 8A:
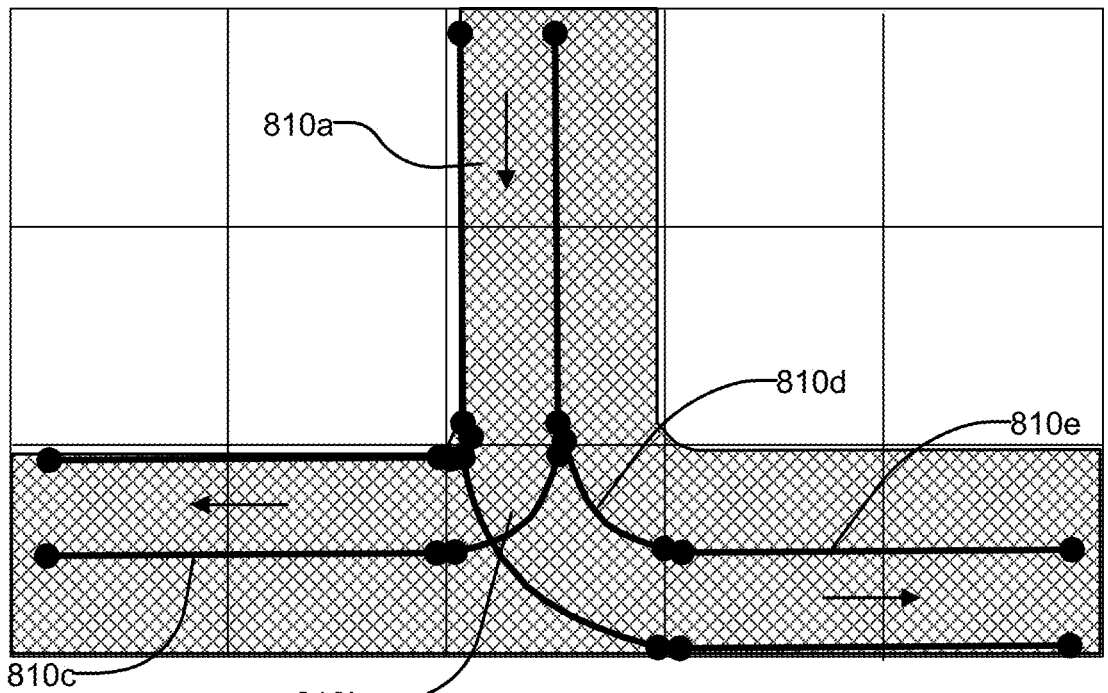
FIGS. 8A-B illustrates lane elements and relations between lane elements in an HD map, according to an embodiment.
Figure 8B:
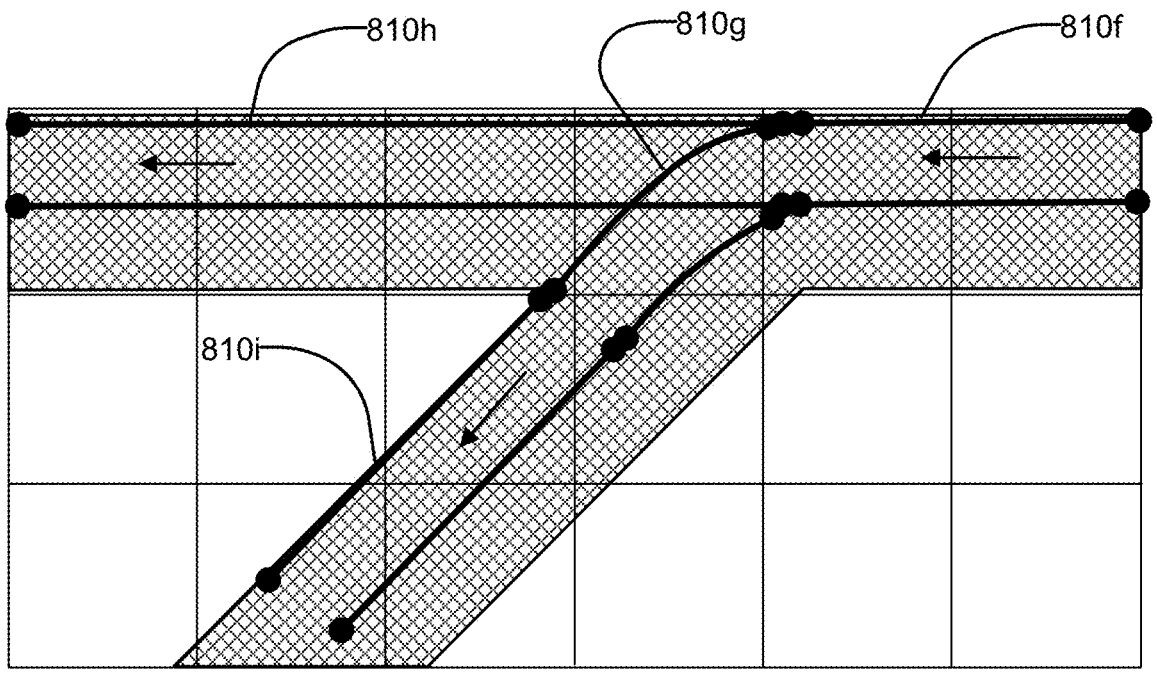

FIGS. 8A-B illustrates lane elements and relations between lane elements in an HD map, according to an embodiment. FIG. 8A shows an example of a T junction in a road illustrating a lane element 810*a* that is connected to lane element 810*c* via a turn lane 810*b* and is connected to lane 810*e* via a turn lane 810*d*. FIG. 8B shows an example of a Y junction in a road showing label 810*f* connected to lane 810*h* directly and connected to lane 810*i* via lane 810*g*. The HD map system 100 determines a route from a source location to a destination location as a sequence of connected lane elements that can be traversed to reach from the source location to the destination location.

Navigable Surface Boundary Implementation

Figure 9A:
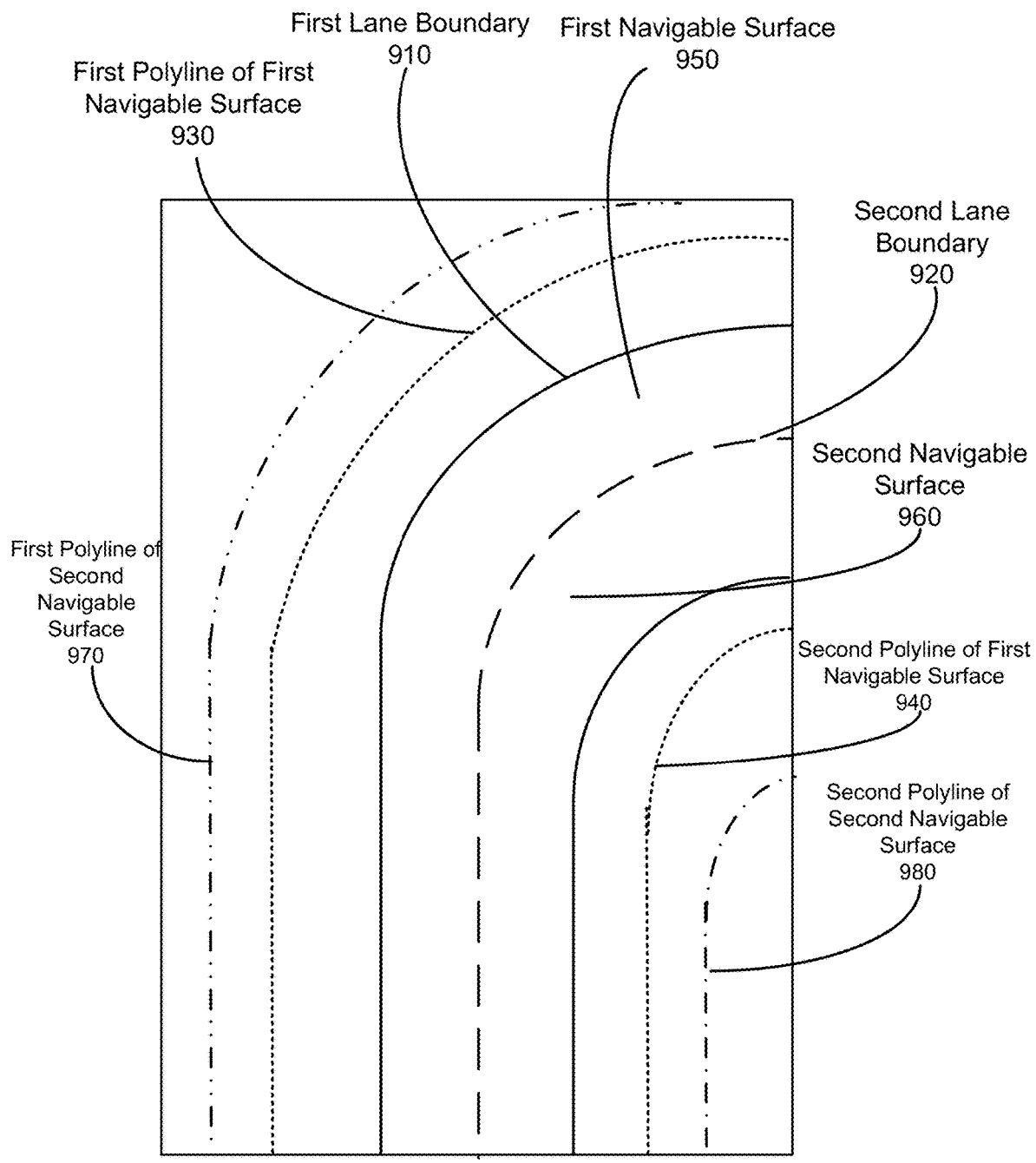
FIG. 9A illustrates a representation of navigable surface boundaries in an HD map, according to an embodiment.
Figure 9B:
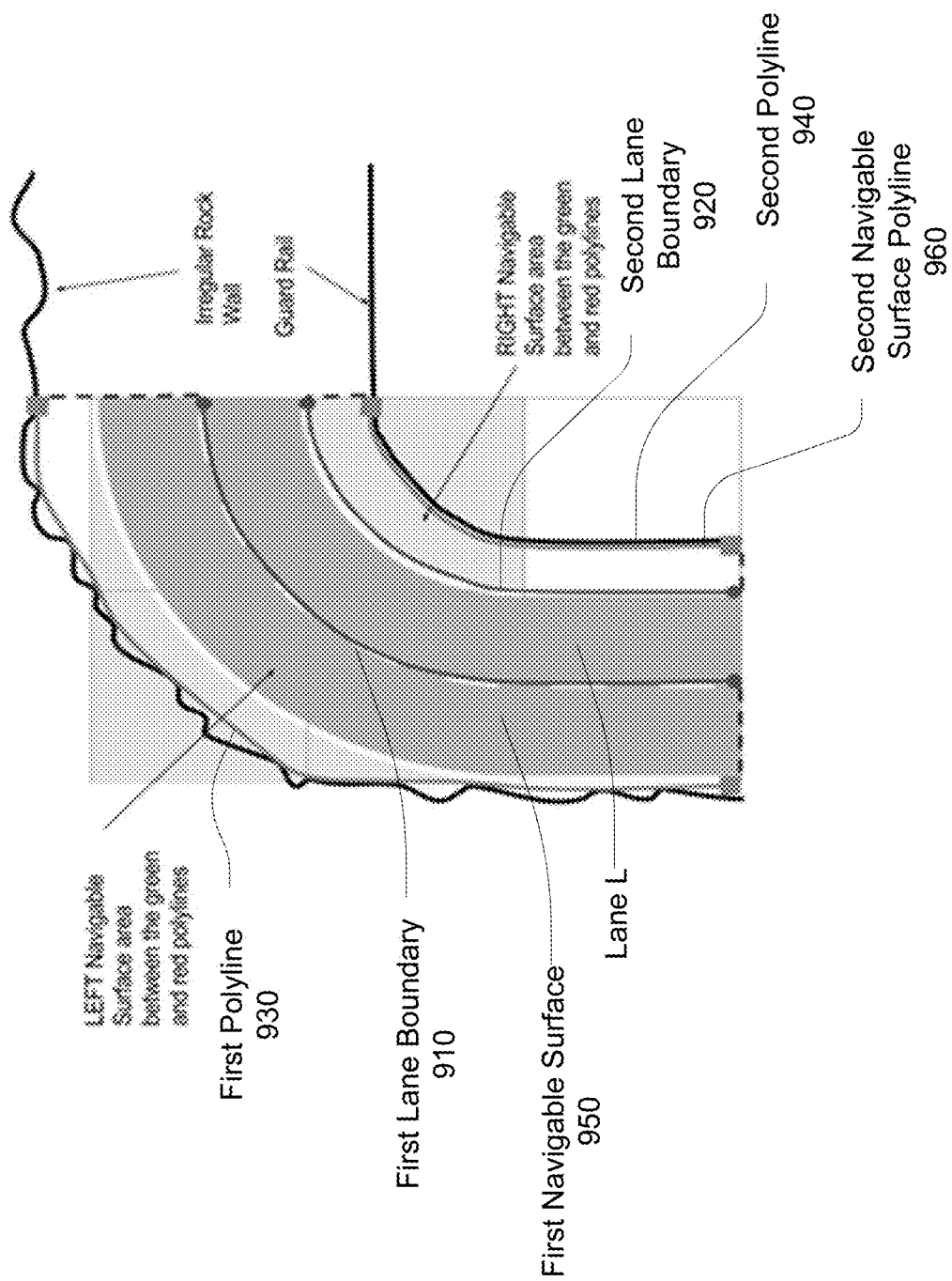
FIG. 9B illustrates a representation of multiple navigable surface boundaries in an HD map, according to an embodiment.

FIG. 9A illustrates a representation of lane boundaries and navigable surface areas in an HD map, according to an embodiment. Navigable surface boundaries describe a physical area that lies beyond the boundary of a lane but within which the vehicle may safely navigate without damage to the vehicle. A given lane has two lane boundaries—a first lane boundary 910 and a second lane boundary 920. Beyond each lane boundary and within a polyline representation is an area of navigable surface. More specifically, between the first lane boundary 910 and the first polyline of first navigable surface polyline 930 lies a first navigable surface 950 over which the autonomous vehicle can travel. Similarly, between the second lane boundary 920 and the second polyline of first navigable surface 940 lies a second navigable surface 960 over which the autonomous vehicle can travel. In some embodiments, a navigable surface area may refer to a shoulder on a road, a sidewalk adjacent to a lane, or a stretch of unpaved land adjacent to a lane. FIG. 9B illustrates an additional representation of a lane element with a first and second navigable surface boundary. Similarly to the first navigable surface boundaries, the second navigable surface boundaries are represented by a first polyline of second navigable surface boundary 970 and a second polyline of second navigable surface boundary 980.

Figure 10:
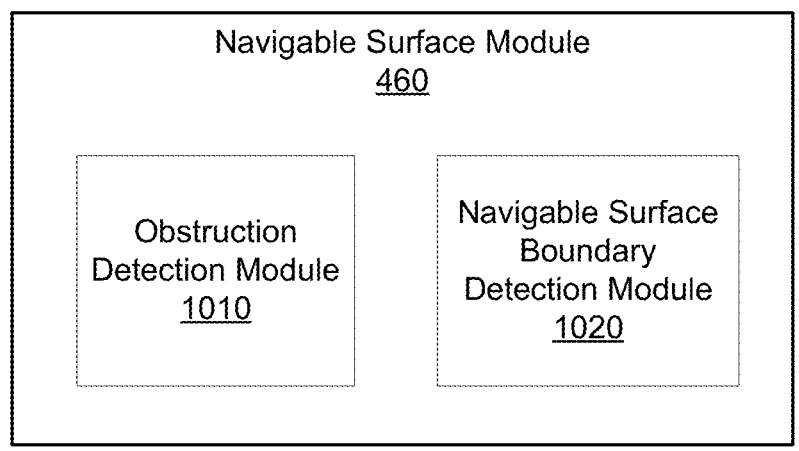
FIG. 10 illustrates a system architecture of the navigable surface module, according to an embodiment.

FIG. 10 illustrates the system architecture of the navigable surface module 460, according to an embodiment. The navigable surface module 460 generates representations of navigable surfaces within a high definition map and utilizes these navigable surfaces to maneuver the autonomous vehicle responsive to certain environmental conditions. The system architecture of the navigable surface module 460 comprises an obstruction detection module 1030 and a navigable surface boundary detection module 1040. In other embodiments, the navigable surface module 460 may include more or fewer modules. Functionality indicated as being performed by a particular module may be performed by other modules instead. Some of the modules of the navigable surface module 460 may be stored in the online HD map system 460.

The obstruction detection module 1030 performs an image analysis to identify obstructions within a lane from a set of a structures within the high definition map. In some embodiments, structures include features such as fences, safety barriers, posts, walls, curbs, ditches or draining depressions, hills, buildings, and trees. The images subject to image analysis may be captured by one or more stationary, positioned sensors or by sensors attached to other vehicles connected with the online HD map system 110. The image analysis process for determining if a structure is an obstruction is further described below in reference to FIG. 12. Additionally, the image analysis recognizes and associates each structure with a type of surface, such as pavement, gravel, or dirt.

From the identified obstructions, the navigable surface boundary detection module 1020 generates a polyline representation of the navigable surface. The process for generating a polyline representation, representing the outer boundary of the navigable surface is further described below in reference to FIG. 13. Using the polyline representation, the vehicle computing system makes a determination of whether or not to travel over the navigable surface. In some embodiments, the determination accounts for a level of difficulty for a vehicle to travel over the navigable surface. Based on the determination, under specific conditions, the vehicle computing system may send control signals to the vehicle controls 130 of the autonomous vehicle to travel over the navigable surface. The process for implementing the navigable surface boundaries in the high definition map is further described below in reference to FIG. 14.

Figure 11:
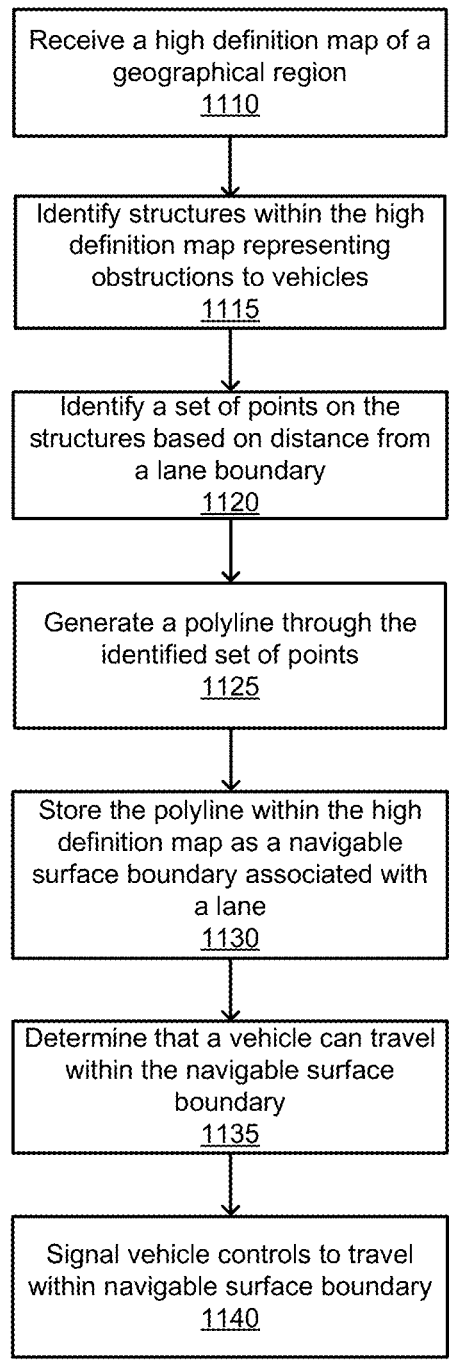
FIG. 11 illustrates a flow chart of the overall process for generating navigable surface boundaries, according to an embodiment.

FIG. 11 describes the process by which the vehicle computing system 120 generates and implements navigable surface boundaries in a high definition map, according to an embodiment. The vehicle computing system 1110 receives a high definition map of a geographical region with 3D representations of objects within the geographical region. From these 3D representations, the obstruction detection module 1030 identifies 1115 structures representing obstructions to vehicles within the high definition map from the set of structures within the geographical region of the high definition map. For each of the structures identified as obstructions, the vehicle computing system 120 identifies 1120 a set of points on the structure based on their perpendicular distance from either the first lane boundary 910 or the second lane boundary 920 and generating 1125 a polyline representing the navigable surface boundary through the previously identified points. The polyline is stored 1130 within the high definition map as a representation of a navigable surface boundary for a specific lane. For each of the stored polylines, the vehicle computing system determines 1135 whether the autonomous vehicle can travel over the navigable surface and based on that determination signals 1140 the vehicle controls to travel within the navigable surface boundary or to continue traveling within the current lane.

Figure 12:
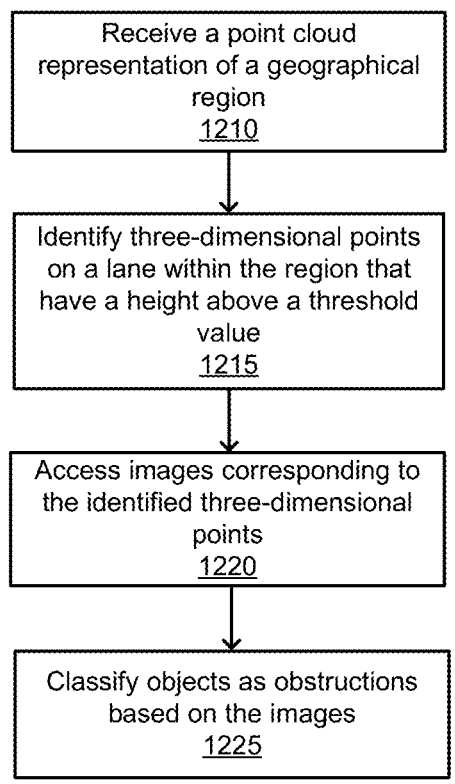
FIG. 12 illustrates a flow chart of the process for obstruction detection, according to an embodiment.

FIG. 12 describes the process for accurately detecting obstructions, according to an embodiment. The obstruction detection module 1010 receives 1210 a three dimensional representation of the geographical region, for example, a point cloud representation of a geographical region and identifies 1215 a set of points on the 3D representations of the structures at heights above a threshold height. In some embodiments, the threshold height is set manually by users of the autonomous vehicle. In other embodiments, the threshold height is determined based on the current surroundings of the autonomous vehicle. From the identified points, the obstruction detection module 1010 accesses 1220 one or more captured images corresponding to the points on the structure and classifies 1225 objects as obstructions based on these images. In some embodiment, a machine learning based object recognition method is used to classify structures into types of obstructions. In an embodiment, the machine learning based object recognition is trained using supervised learning by providing labelled training data set comprising images and labels identifying the structures in the images.

Figure 13:
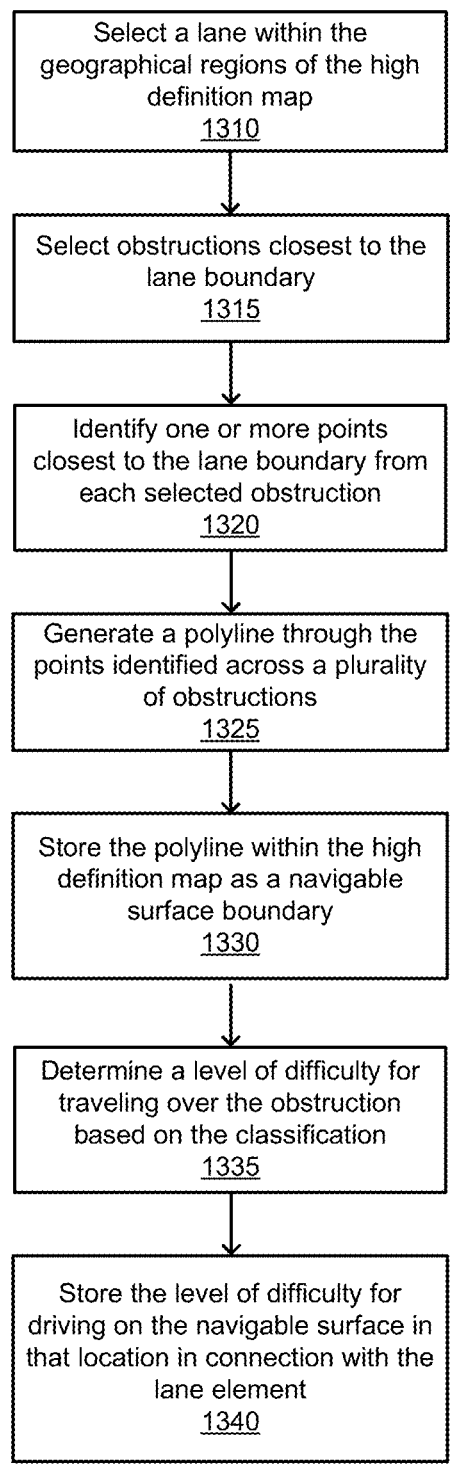
FIG. 13 illustrates a flow chart of the process for determining navigable surface boundaries, according to an embodiment.

FIG. 13 describes the process for generating a polyline representation of a navigable surface boundary, according to an embodiment. The navigable surface boundary detection module 1020 selects 1310, from the geographical regions of the high definition map, the lane on which the autonomous vehicle is currently traveling. The navigable surface boundary module 1020 selects 1315 one or more structures within the lane and determines the perpendicular distance between the lane boundary the structure. If there are multiple structures encountered while travelling away from a lane boundary, the navigable surface boundary module 1020 selects the nearest structure to the lane boundary since that is the structure a vehicle would encounter if the vehicle drove off of the lane. For each selected structure, the navigable surface boundary module 1020 identifies 1320 a point with the smallest perpendicular distance from the boundary and generates 1325 a polyline through the identified points across a plurality of obstructions. The navigation surface boundary detection module 1020 generates 1330 a polyline through the identified point and neighboring identified points from the remaining selected obstructions and stores 1330 the polyline within the high definition map as a navigable surface boundary.

At each point on the polyline, the navigable surface boundary detection module determines 1335 a level of difficulty score within the high definition map describing the difficulty that the autonomous vehicle would experience traveling over the obstruction. In some embodiments, the level of difficulty accounts for the make and model of the autonomous vehicle. In other embodiments, the level of difficulty is associated with the type of navigable surface and the structures on the navigable surface boundary (i.e, the physical properties, geometric dimensions, and type of obstruction). For example, a paved shoulder may be associated with a lower level of difficulty than a gravel shoulder. Additionally, a smooth slope as a structure is less difficult to drive over compared to a curb, possibly resulting in a higher level of difficulty being associated with the curb. Furthermore, the difficulty of driving over the curb is determined based on the height of the curb. In some embodiments, the level of difficulty also accounts for the risk of damage to the vehicle. For example, a sidewalk with a curb has a higher level of difficulty than a sidewalk without a curb because the vehicle may be damaged by hitting the curb. Additionally, in determining the level of difficulty, the risk of damage must be balance by alternative options, such as hitting an obstacle in the lane. The navigable surface boundary detection module stores 1340 the level of difficulty within the high definition map system at various points along the polyline.

Figure 14:
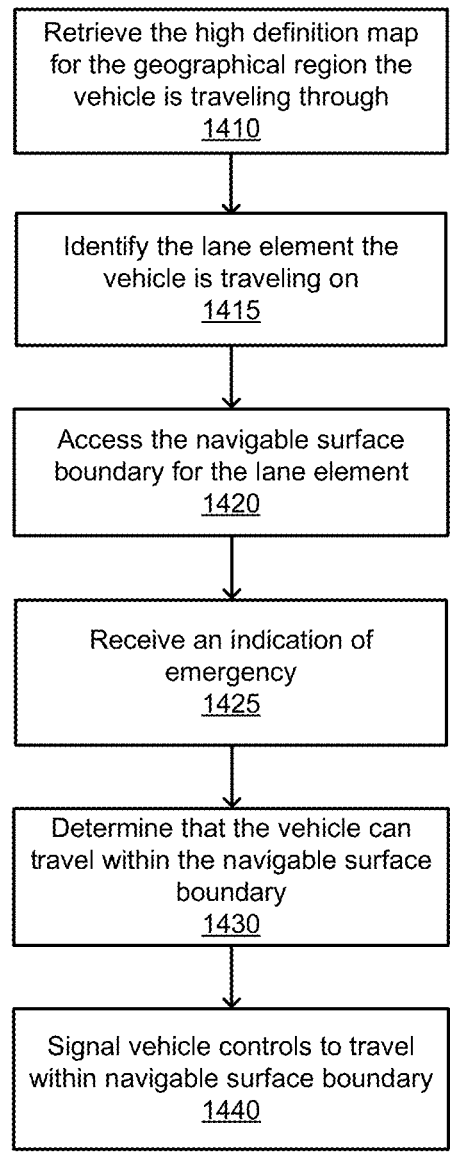
FIG. 14 illustrates a flow chart of the process for implementing navigable surface boundaries in a high definition map, according to an embodiment.

FIG. 14 describes the process for implementing the navigable surface boundary, according to an embodiment. The lane runtime processing module 280 retrieves 1410 the high definition map for the geographical regions of the high definition map and identifies 1415 the lane element on which the autonomous vehicle is currently traveling. For the identified lane element, the lane runtime processing module 280 accesses 1420 the navigable surface boundary. In the event of an emergency, the lane runtime processing module 280 receives 1420 an indication of emergency. An emergency refers to an extenuating circumstance that may unexpectedly force the autonomous vehicle out of their lane, for example, another car swerving out of control, large debris blocking the lane, or a hole in the middle of the road. The vehicle detects the emergency by detecting the lane condition via the sensors of the vehicle and analyzing the image, for example, to detect an obstruction within the lane that prevents the lane from continuing to travel in the lane. The vehicle determines if the vehicle could change lane to move to an adjacent lane. If the vehicle determines that the adjacent lane is blocked or if there is no adjacent lane, the vehicle determines whether it is safe to drive on the navigable surface of the lane, if available.

After receiving the indication of emergency, the lane runtime processing module 280 determines 1425, based on the levels of difficulty stored within the points of the polyline, whether the vehicle can safely travel over the navigable surface. If it is determined that it is safe for the vehicle to travel over the navigable surface, the lane runtime processing module 280 signals the vehicle controls of the autonomous vehicle to move out of the current lane and travel within the navigable surface boundary. The vehicle sensors continue to monitor the lane conditions to determine whether it is safe to return to the lane from the navigable surface. If the vehicle computing system 120 determines that the lane conditions are safe, the vehicle computing system 120 sends control signals the to the vehicle controls 130, causing the vehicle to return to the lane associated with the navigable surface boundary. In some embodiments, the lane runtime processing module 280 continuously monitors the levels of difficulty stored within the polylines and compares it with the severity of emergency determined within the lane to determine whether it is safer to return to the lane.

Route Planning and Generation

FIG. 15 illustrates the system architecture of the route generation module 260, according to an embodiment. The route generation module 260 stores a set of partial routes and grows them to obtain a final route. The system architecture of the route generation module 260 comprises a low resolution route generator 1510, partial route store 1520, a partial route generation module 1530, a geographical region store 1540, a lane element selection module 1550, and a route error analysis module 1560. In other embodiments, the route generation module 260 may include more or fewer modules. Functionality indicated as being performed by a particular module may be performed by other modules instead. Some of the modules of the route generation module 260 may be stored in the online HD map system 110.

The low resolution route generator 1510 generates a low resolution route from a source to a destination. In an embodiment, the low resolution route generator 1510 invokes an existing map service that is based on low resolution maps to obtain the low resolution route. A map service may provide low resolution maps that are interpreted by humans for navigation purposes. Accordingly, these are human navigable maps. In some embodiments, human navigable maps are based on latitude/longitude and include information that may not be available in an HD map, for example, addresses associated with latitude/longitude coordinates, human readable names for places, boundaries for places (such as park boundaries), geocoding for converting an address to a latitude/longitude, reverse-geocoding for converting a latitude/longitude to a nearest physical address, and routing between two addresses. In contrast, the HD map includes information that may not be included in a human navigation map, for example, 3D descriptions of lanes including lane line boundaries, 3D locations of signs related to driving restrictions, such as speed limits, directions, right of way, stop signs, and 3D description of the world for obstacle avoidance functionality and localization. Accordingly, the low resolution route generated from a low resolution map comprises a list of Latitude (Lat) and Longitude (Lng) values that are used to draw the route on a human understandable map rendering. Furthermore, the low resolution map has low resolution and low accuracy, for example, accuracy to around 5-10 m generally. In contrast, the route generated by the route generation module 260 has centimeter level accuracy and resolution to be able to safely direct an autonomous vehicle from source to the destination.

The partial route store 1520 maintains a data structure that stores partial routes. The data structure may be stored in memory for faster access. In an embodiment, the data structure used for storing partial routes is a queue data structure that supports add and delete operations. An add operation allows a software module to add an element to the queue and a delete operation provides the element to the software module invoking the delete operation and removes it from the queue data structure. In other embodiments, different data structures can be used for storing partial routes, for example, a tree data structure.

The partial route generation module 1530 accesses potential partial routes (e.g., route hypotheses) from the partial route store 1520 and grows them by adding lane elements to the partial routes accessed. Accordingly, the partial route generation module 1530 generates new partial routes that are longer than the original partial routes accessed. The partial route generation module 1530 may prune some of the partial routes or add them back to the partial route store 1520.

The geographical region store 1540 stores data describing geographical regions obtained from the online HD map system 110. The vehicle computing system 120 of the vehicle retrieves these geographical regions from the online HD map system 110. The geographical region store 1540 stores data describing geographical regions. Geographical regions are described in reference to FIG. 6A-6B. A geographical region includes lane elements corresponding to streets or roads that pass through the geographical region. In an embodiment, the lane elements are connected as a lane element graph where lane elements (L1, L2) have an edge between them if a vehicle can drive from lane element L1 to L2. Each edge may be associated with an edge type describing the relationship between two lanes. For example, a particular edge type may indicate that the two lanes are parallel and belong to different lanes whereas another edge type may indicate that they are consecutive lanes that are part of the same lane. A geographical region stores a subset of the lane element graph that corresponds to lanes that overlap the geographical region.

The lane element selection module 1550 selects lane elements that can be added to a partial route for growing the partial route. In an embodiment, the lane element selection module 1550 selects lane elements that are adjacent to at least one of the lane elements in the partial route such that a vehicle can legally drive from a lane element of the partial route to the selected lane element or from the selected lane element to a lane element of the partial route. Accordingly, the lane element selection module 1550 determines which lane elements are compatible with the current partial route and provides these elements to the partial route generation module for growing the current partial route.

The route error analysis module 1560 analyzes the route generated by adding a new lane element is added to an existing route by computing the deviation of the generated route from the low resolution route to ensure the generated route is efficient for travelling from source to the destination and not incorrect. The route error analysis module 1560 determines a threshold error value that represents an error tolerance for points along the route. The route error analysis module 1560 determines that a partial route is not acceptable if there are one or more points that deviate from the low resolution route by more than the threshold value. The route error analysis module 1560 may determine the threshold value by trial and error on a set of data with known routes. Alternatively, the route error analysis module 1560 may receive the threshold value from a user, for example, a system administrator. In another embodiment, the route error analysis module 1560 receives an initial estimate of the threshold from a user and then adjusts it based on test data comprising existing routes that were verified to be accurate as well as existing routes that were verified to be incorrect.

Figure 16:
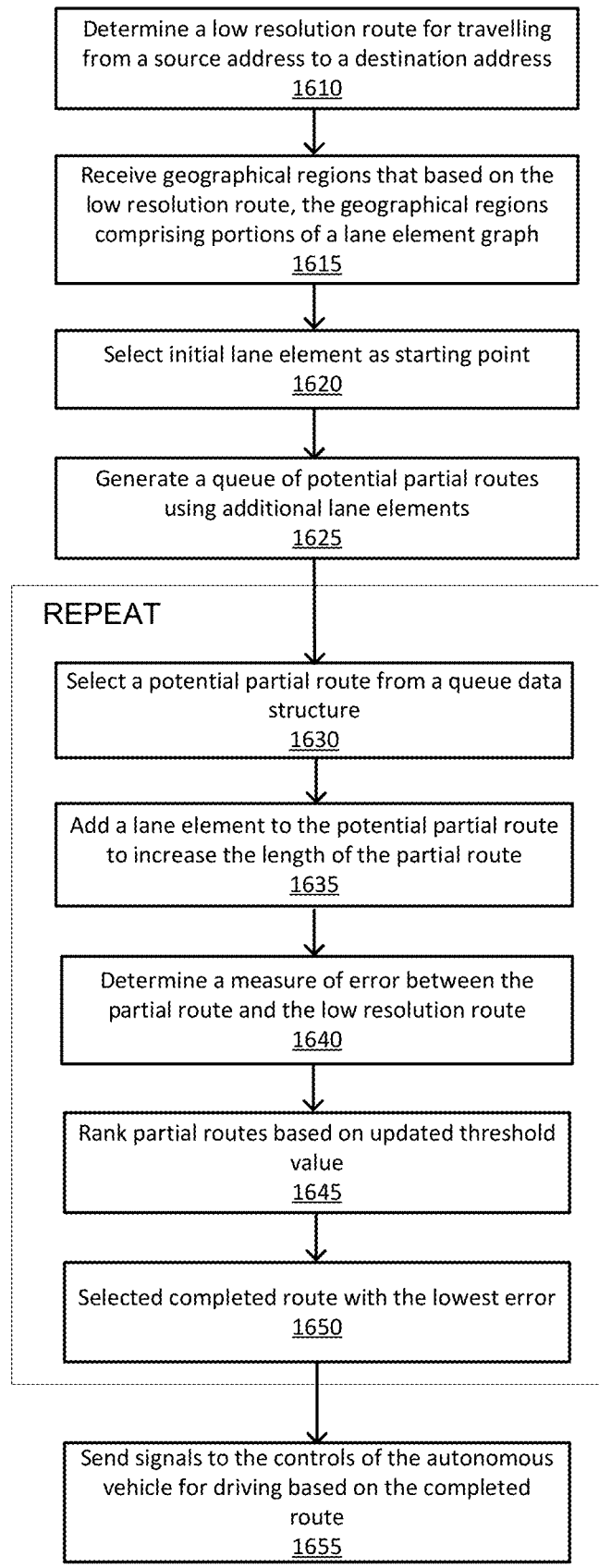
FIG. 16 illustrates a flow chart of the route generation process, according to an embodiment.

FIG. 16 describes the process by which the vehicle computing system 120 generates high definition map routes, according to one embodiment. The vehicle computing system 120 determines 1610 a low resolution route for travelling from a source address to a destination address. In an embodiment, the low resolution route is received from a third-party map provider, for example, from GOOGLE MAPS used as a web service. In one embodiment, the low resolution route comprises an ordered set of one or more geocoded instructions such as latitude and longitude coordinates derived from physical addresses. The destination address may be provided by the user of the autonomous vehicle. The term "streets" encompasses different types of paths that a vehicle can drive on, for example, highways, roads, avenues, boulevards, alleys, roundabouts, and so on.

After determining 1610 the low resolution route, the vehicle computing system 120, receives 1615, from the online HD system 110, one or more geographical regions based on the low resolution route. The received geographical regions cover a geographical area through which the low resolution route passes. Accordingly, the vehicle computing system 120 receives all the necessary data for determining a high resolution path from the source to the destination. In some embodiments, the vehicle computing system 120 checks if any of the required geographical regions was previously retrieved and stored in the geographical region store 1520. Accordingly, the vehicle computing system 120 receives from the online HD map system 110, only the geographical regions that were not previously retrieved and stored in the geographical region store 1540.

The vehicle computing system 120 selects 1620 a lane element as a starting point and constructs a subset of the lane element graph that represents a route from the source address to the destination address using lane elements found within the retrieved set of geographical regions. In some instances, a single geographical region may encompass the low resolution route if both the current location and destination are located in the same region. In some embodiments the vehicle computing system 120 concurrently retrieves the geographical regions and builds partial routes based on geographical regions that have been retrieved so far. In an alternate embodiment, instead of the vehicle computing system generating the route based on the received geographical regions, the online HD system 120 using these required geographical regions to construct the route from the lane element graph and delivers the route to the vehicle computing system 120 to execute.

The partial route generation module 1530 generates 1625 a set of potential partial routes, which are hypotheses for the route for traveling from the source address to the destination address from the retrieved geographical regions. The partial route generation module 1530 stores the generated potential partial routes in a queue data structure stored in the partial route store 1520. Although the following description uses a queue as data structure for storing the partial routes, other embodiments can use other data structures. In an embodiment, the partial route generation module 1530 starts from one of the end points of the route, for example, the source or the destination and builds increasingly longer potential partial routes from that end point. The partial route generation module 1530 adds some initial potential partial routes that correspond to lane elements that are adjacent to the end point and allow moving in a direction determined based on the low resolution route. In one embodiment, lane elements within the queue are updated each time an additional lane element is identified. For example, if lane element A is stored in the queue and diverges into two lane elements A' and A" both with errors below the threshold error, lane element A is removed from the queue and replaced with A' and A". The threshold error may be established as a dynamic value relative to the errors of other potential partial routes. For example, if R1 and R2 are two potential partial routes, with respective errors of 0.3 and 0.5, the threshold error may be set to 0.3 and R2 will be removed from the queue. After the addition of more lane elements, potential route R3 has an error of 0.1, the threshold will be updated to 0.1, and R1 will be removed from the queue. A similar iterative process for updating the threshold values will be performed until a complete route is generated. In another embodiment, the queue stores aggregated eligible partial routes, only removing partial routes with errors above the threshold error.

Based on the route error analysis, described below, some or none of these potential partial routes may get removed for the set of potential partial routes. For routes that remain, appropriate lane elements are connected to each of the potential partial routes until the modified route exceeds the threshold error value. The process stops when the vehicle computing system determines a single complete route that does not exceed the threshold error value. In some embodiments, a single potential partial route may encounter a junction branching in a plurality of directions, for example, A, B, and C, resulting in the single potential partial route being replaced by three potential partial routes, one partial proceeding in direction A, another in direction B, and the third in direction C. The partial route generation module 1530 identifies additional lane elements that can be connected and the route error analysis module 1560 computes the error of each potential partial route and may remove any potential partial route that exceeds the error threshold value.

The partial route generation module 1530 incrementally aggregates lane elements into a complete route with accuracy checks being conducted at each incremental addition. The partial route generation module 1530 performs the steps 1630, 1635, 1645, 1645, and 1650 repeatedly until a full route is found from the source to the destination. The partial route generation module 1530 selects 1630 a potential partial route from the set of partial routes stored in the queue data structure. The lane element selection module 1550 receives the selected potential partial route as input and determines an additional lane element from the lane element subgraphs of a geographical region that connects to the existing potential partial route and allows a vehicle to legally travel along the potential partial route and through the additional lane element. For example, if the potential partial route is for travelling to the right, the lane element selection module 1550 may not select a lane element in which traffic moves to the left. The partial route generation module 1530 adds 1635 the selected lane element to the selected potential partial route. Once a potential partial route has been connected with an additional lane element, it is referred to as a modified partial route until it is considered for the connection of another lane element.

After the lane element is added to the partial route, the route error analysis module 1560 determines 1640 the error between the modified partial route and the low resolution route. In an embodiment, the error describes a perpendicular distance between points of the modified partial route and the corresponding points of the low resolution route. The partial route generation module 1530 compares error representing the maximum perpendicular distance between points of the modified partial route and the corresponding points of the low resolution route with a threshold value indicating the maximum distance by which the high definition map can deviate from the low resolution route. If the partial route generation module 1530 determines that the error is less than the threshold value, the partial route generation module 1530 adds the modified partial route to the queue data structure, or else the partial route generation module 1530 eliminates the modified partial route from further consideration.

The lane element selection module 1550 generates a set of all additional lane elements that could be connected the partial route to produce a set of modified partial routes corresponding to each additional lane element. The route error analysis module 1560 determines a measure of error for each modified partial route. In other embodiments, route error analysis module 1560, at each added lane element, compares the aggregate error between each lane element of the modified partial route to the low resolution route to the threshold error. Each time a new error is computed, the partial route generation module 1530 compares the error to the threshold value and ranks 1645 the partial routes based on the threshold value. In the event that the computed error exceeds the threshold, the modified partial route is removed from the set of partial routes and the next modified partial route is analyzed. In some embodiments, if the partial route generation module 1530 determines that no additional lane elements may be added to the potential partial route without exceeding the threshold error, the potential partial route gets removed from the set of potential partial routes stored in the queue data structure. Alternatively, if the computed error for a particular modified partial route does not exceed the threshold value, the particular modified partial route is added to the queue data structure and the threshold value is updated to reflect the added modified partial route. In an embodiment, the partial route generation module 1530 selects the next potential partial route for processing in a ranked order of increasing errors, thereby processing potential partial routes having less error first. The above analysis executed by the potential partial route generation module 1530 repeatedly for the entire set of potential partial routes. Once all the potential routes that go between a start and an endpoint (e.g., potential completed routes or complete route hypotheses) have been analyzed, the route with the lowest error is selected 1650 as the final route. In some embodiments, the partial route generation module 1530 selects the first route that reaches from the source to destination. The vehicle computing system sends 1655 signals to the vehicle controls system 130 for driving along the final route.

Returning to the example describing a single lane element splitting into three different directions, in some instances the computed errors for each lane element splitting from a junction may be below the error threshold, in which case a modified partial route corresponding to each lane element is added to the queue data structure. Next, for each of the three modified partial routes, a second set of identified lane elements are identified and further added to the modified partial route and analyzed. To further expand on the current example, if each of the three modified partial routes is further split by three junctions, the queue would potentially include nine new modified partial routes, assuming their errors are below the error threshold. This process is repeated until a modified partial route allows a vehicle to travel from the source address to the destination address.

Computing Machine Architecture

Figure 17:
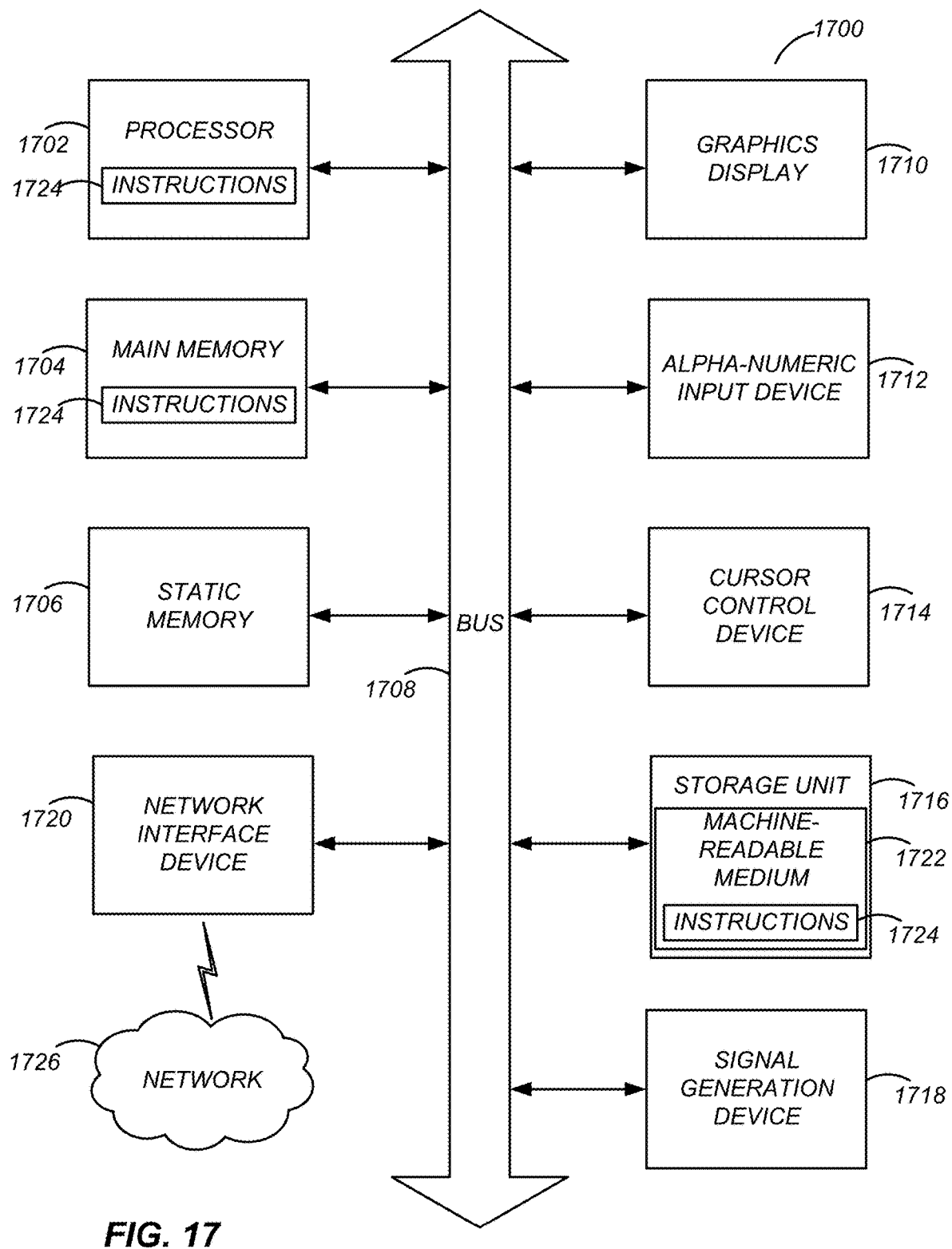
FIG. 17 illustrates an embodiment of a computing machine that can read instructions from a machine-readable medium and execute the instructions in a processor or controller.

FIG. 17 is a block diagram illustrating components of an example machine able to read instructions from a machine-readable medium and execute them in a processor (or controller). Specifically, FIG. 17 shows a diagrammatic representation of a machine in the example form of a computer system 1700 within which instructions 1724 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1724 (sequential or otherwise) that specify actions to be taken by that machine. Further, while only a single machine is illustrated, the term "machine" shall also be taken to include any collection of machines that individually or jointly execute instructions 1724 to perform any one or more of the methodologies discussed herein.

The example computer system 1700 includes a processor 1702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1704, and a static memory 1706, which are configured to communicate with each other via a bus 1708. The computer system 1700 may further include graphics display unit 1710 (e.g., a plasma display panel (PDP), a liquid crystal display (LCD), a projector, or a cathode ray tube (CRT)). The computer system 1700 may also include alphanumeric input device 1712 (e.g., a keyboard), a cursor control device 1714 (e.g., a mouse, a trackball, a joystick, a motion sensor, or other pointing instrument), a storage unit 1716, a signal generation device 1718 (e.g., a speaker), and a network interface device 1720, which also are configured to communicate via the bus 1708.

The storage unit 1716 includes a machine-readable medium 1722 on which is stored instructions 1724 (e.g., software) embodying any one or more of the methodologies or functions described herein. The instructions 1724 (e.g., software) may also reside, completely or at least partially, within the main memory 1704 or within the processor 1702 (e.g., within a processor's cache memory) during execution thereof by the computer system 1700, the main memory 1704 and the processor 1702 also constituting machine-readable media. The instructions 1724 (e.g., software) may be transmitted or received over a network 1726 via the network interface device 1720.

While machine-readable medium 1722 is shown in an example embodiment to be a single medium, the term "machine-readable medium" should be taken to include a single medium or multiple media (e.g., a centralized or distributed database, or associated caches and servers) able to store instructions (e.g., instructions 1724). The term "machine-readable medium" shall also be taken to include any medium that is capable of storing instructions (e.g., instructions 1724) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

What is claimed is:

1. A non-transitory computer readable storage medium having instructions for determining a route using a high definition map encoded thereon that, when executed by a processor, cause the processor to perform operations comprising:
receiving, by an autonomous vehicle, a low resolution route from a source address to a destination address, the low resolution route identifying a set of streets for traveling from the source address to the destination address, wherein each street comprises one or more lanes;
receiving a representation of a lane element graph of high definition map data, the lane element graph comprising nodes representing lane elements of the one or more lanes and edges representing connections between lane elements;
determining a high resolution route between the source address and the destination address based on a set of potential partial routes to an intermediate point of the low resolution route between the source address and the destination address, each partial route being generated based on connecting the lane elements of the lane element graph and represented as a sequence of connected lane elements of the lane element graph, the determining comprising repeatedly performing steps of:
selecting a potential partial route from the set of potential partial routes;
identifying from the lane element graph, an additional lane element connected to a lane element of the selected potential partial route;
determining a measure of error that represents a locational difference between the low resolution route and a modified partial route obtained by adding the additional lane element to the selected potential partial route; and
responsive to the measure of error being below a threshold value, replacing the selected partial route with the modified partial route and updating the threshold value to the measure of error for the modified partial route;
determining a potential completed route based on a particular potential partial route from the set of potential partial routes connecting the source address to the destination address; and
selecting the potential completed route as the high resolution route, responsive to the potential completed route having a measure of error less than any other potential completed route or potential partial route.

2. The non-transitory computer readable medium of claim 1, wherein the low resolution map is represented as a navigation map generated by a third party map provider, the navigation map comprising geocoded instructions for a route from the source address to the destination address.

3. The non-transitory computer readable medium of claim 2, wherein the received navigation map is based on latitude-longitude coordinates.

4. The non-transitory computer readable medium of claim 1, wherein the edge between a first lane element and a second lane element indicates a physical proximity between the lane elements, over which a vehicle may travel directly from a portion of a street corresponding to the first lane element to a portion of a street corresponding to the second lane element.

5. The non-transitory computer readable medium of claim 1, wherein a lane element comprises one or more of:
geometric lane boundaries;
a direction of traffic within the lane compared to the high resolution route;
static traffic flow restrictions; or
non-traffic road features.

6. The non-transitory computer readable medium of claim 1, further comprising: retrieving representations of one or more geographical regions overlapping the low resolution route from an online server, each representation of a geographical region comprising a plurality lane elements and relations between lane elements.

7. The non-transitory computer readable medium of claim 1, further comprising:
sending information describing geocoded instructions of the low resolution route to an online server; and
receiving one or more geographical regions through which the low resolution route passes.

8. The non-transitory computer readable medium of claim 1, further comprising:
responsive to the measure of error being above the threshold value, rejecting the additional lane element, wherein the threshold value is not updated; and
identifying, from the lane element graph, an alternate additional lane element connected to a lane element of the partial route.

9. The non-transitory computer readable medium of claim 1, further comprising:
responsive to determining that no other additional lane element connected to the potential partial route results in a modified partial route has an error below the threshold value, removing the selected potential partial route from the set of potential partial routes; and
selecting a second potential partial route from the set of potential partial routes.

10. The non-transitory computer readable medium of claim 1, wherein the measure of error represents the perpendicular distance between lane elements along the length of the potential partial route and the low resolution route.

11. The non-transitory computer readable medium of claim 1, wherein determining the measure of error further comprises:
establishing the threshold value, the threshold value representing the maximum allowable perpendicular distance between a potential partial route and the low resolution route;
identifying additional lane elements that may be added to the partial route; and
computing the measure of error for each possible additional lane element.

12. The non-transitory computer readable medium of claim 11, wherein the measure of error is determined for each modified partial route and the threshold value is updated to represent a lowest measure of error for a potential completed route.

13. The non-transitory computer readable medium of claim 1, wherein responsive to identifying a plurality of additional lane elements for adding to a potential partial route:
  determining a plurality of modified partial routes, each modified partial route obtained by adding an additional lane to the potential partial route; and
  adding the modified partial routes to the plurality of potential partial routes responsive to determining that the modified partial route has a measure of error below a current updated threshold value.

14. A method for determining a route using a high definition map comprising:
  receiving, by an autonomous vehicle, a low resolution route from a source address to a destination address, the low resolution route identifying a set of streets for traveling from the source address to the destination address, wherein each street comprises one or more lanes;
  receiving a representation of a lane element graph of high definition map data, the lane element graph comprising nodes representing lane elements of the one or more lanes and edges representing connections between lane elements;
  determining a high resolution route between the source address and the destination address based on a set of potential partial routes to an intermediate point of the low resolution route between the source address and the destination address, each partial route being generated based on connecting the lane elements of the lane element graph and represented as a sequence of connected lane elements of the lane element graph, the determining comprising repeatedly performing steps of:
    selecting a potential partial route from the set of potential partial routes;
    identifying from the lane element graph, an additional lane element connected to a lane element of the selected potential partial route;
    determining a measure of error that represents a locational difference between the low resolution route and a modified partial route obtained by adding the additional lane element to the selected potential partial route; and
    responsive to the measure of error being below a threshold value, replacing the selected partial route with the modified partial route and updating the threshold value to the measure of error for the modified partial route;
  determining a potential completed route based on a particular potential partial route from the set of potential partial routes connecting the source address to the destination address; and
  selecting the potential completed route as the high resolution route, responsive to the potential completed route having a measure of error less than any other potential completed route or potential partial route.

15. The method of claim 14, wherein the low resolution map is represented as a navigation map generated by a third party map provider, the navigation map comprising geo-coded instructions based on latitude and longitude coordinates for a route from the source address to the destination address.

16. The method of claim 14, wherein the edge between a first lane element and a second lane element indicates a physical proximity between the lane elements, over which a vehicle may travel directly from a portion of a street corresponding to the first lane element to a portion of a street corresponding to the second lane element.

17. The method of claim 14, further comprising, retrieving representations of one or more geographical regions overlapping the low resolution route from an online server, each representation of a geographical region comprising a plurality lane elements and relations between lane elements.

18. The method of claim 14, further comprising:
  responsive to the measure of error being above the threshold value, rejecting the additional lane element, wherein the measure of error represents the perpendicular distance between lane elements along the length of the potential partial route and the low resolution route, and wherein the threshold value is not updated; and
  identifying, from the lane element graph, an alternate additional lane element connected to a lane element of the potential partial route.

19. The method of claim 14, wherein responsive to identifying a plurality of additional lane elements for adding to a potential partial route:
  determining a plurality of modified partial routes, each modified partial route obtained by adding an additional lane to the potential partial route; and
  adding the modified partial routes to the plurality of potential partial routes responsive to determining that the modified partial route has a measure of error below a threshold value.

20. A method for determining a route using a high definition map, the method comprising:
  storing a lane element graph of high definition map data, the lane element graph comprising lane elements of one or more lanes of streets and edges/nodes;
  storing a plurality of geographical regions, each geographical region describing a section of a world map;
  receiving a request from an autonomous vehicle, the request describing instructions in the form of a low resolution route from a source location to a destination;
  identifying geographical regions through which the low resolution route passes;
  determining a subset of a lane element graph for a low resolution route based on the identified geographical regions, wherein the subset of the lane element graph represents lane elements of; and
  sending a representation of the subset of lane element graph to the autonomous vehicle, wherein the autonomous vehicle uses the lane element graph to construct a high definition route for driving from the source location to the destination, the high definition route being constructed by connecting lane elements of the subset of the lane element graph.

* * * * *